(12) United States Patent
Patki et al.

(10) Patent No.: US 12,366,073 B2
(45) Date of Patent: *Jul. 22, 2025

(54) FLOOR ELEMENT FOR FORMING A FLOOR COVERING, A FLOOR COVERING, AND A METHOD FOR MANUFACTURING A FLOOR ELEMENT

(71) Applicant: Dal-Tile, LLC, Dallas, TX (US)

(72) Inventors: Rahul Patki, Richardson, TX (US); Claudio Caselli, Dallas, TX (US)

(73) Assignee: Dal-Tile, LLC, Dallas, TX (US)

( * ) Notice: Subject to any disclaimer, the term of this patent is extended or adjusted under 35 U.S.C. 154(b) by 340 days.

This patent is subject to a terminal disclaimer.

(21) Appl. No.: 17/624,279

(22) PCT Filed: Feb. 11, 2020

(86) PCT No.: PCT/US2020/017696
§ 371 (c)(1),
(2) Date: Dec. 31, 2021

(87) PCT Pub. No.: WO2021/002888
PCT Pub. Date: Jan. 7, 2021

(65) Prior Publication Data
US 2022/0403669 A1    Dec. 22, 2022

(30) Foreign Application Priority Data

Jul. 1, 2019  (WO) ............... PCT/US2019/040083

(51) Int. Cl.
*E04F 15/08* (2006.01)
*B32B 3/06* (2006.01)
(Continued)

(52) U.S. Cl.
CPC .............. *E04F 15/087* (2013.01); *B32B 3/06* (2013.01); *B32B 7/12* (2013.01); *B32B 9/005* (2013.01);
(Continued)

(58) Field of Classification Search
CPC . E04F 15/02038; E04F 15/087; E04F 15/107; E04F 2201/0146;
(Continued)

(56) References Cited

U.S. PATENT DOCUMENTS 3,050,493 A * 8/1962 Wagner .................. C09J 163/00
523/420
3,239,981 A * 3/1966 Fitzgerald .......... E04F 13/0862
52/309.3
(Continued)

FOREIGN PATENT DOCUMENTS

| CA | 2523866 C | 7/2015 |
|----|-----------|--------|
| CN | 102264986 B | 5/2014 |

(Continued)

OTHER PUBLICATIONS

International Search Report and Written Opinion for International (PCT) Application No. PCT/US2019/040083 mailed Sep. 18, 2019.
(Continued)

*Primary Examiner* — James M Ference
(74) *Attorney, Agent, or Firm* — Troutman Pepper Locke LLP; James E. Schutz; Chris N. Davis

(57) ABSTRACT

A floor element for forming a floor covering, wherein the floor element comprises a decorative layer made of a ceramic material, an intermediate layer having a resin material that permeates a lower surface of the decorative layer, and a support layer arranged below this decorative layer, wherein the support layer comprises edges provided with
(Continued)

coupling elements configured to realize a mechanical coupling with coupling elements of an adjacent floor element.

20 Claims, 3 Drawing Sheets

(51) Int. Cl.
| | | |
|---|---|---|
| B32B 7/12 | (2006.01) | |
| B32B 9/00 | (2006.01) | |
| B32B 9/04 | (2006.01) | |
| B32B 27/06 | (2006.01) | |
| B32B 27/30 | (2006.01) | |
| B32B 37/12 | (2006.01) | |
| B32B 38/08 | (2006.01) | |
| E04F 15/02 | (2006.01) | |
| E04F 15/10 | (2006.01) | |

(52) U.S. Cl.
CPC .............. *B32B 9/045* (2013.01); *B32B 27/06* (2013.01); *B32B 27/304* (2013.01); *B32B 37/12* (2013.01); *B32B 38/08* (2013.01); *E04F 15/02038* (2013.01); *E04F 15/0215* (2013.01); *E04F 15/082* (2013.01); *E04F 15/107* (2013.01); *B32B 2250/02* (2013.01); *B32B 2255/00* (2013.01); *B32B 2255/26* (2013.01); *B32B 2260/02* (2013.01); *B32B 2260/046* (2013.01); *B32B 2307/402* (2013.01); *B32B 2307/546* (2013.01); *B32B 2307/718* (2013.01); *B32B 2307/732* (2013.01); *B32B 2309/04* (2013.01); *B32B 2309/12* (2013.01); *B32B 2315/02* (2013.01); *B32B 2327/06* (2013.01); *B32B 2451/00* (2013.01); *B32B 2471/00* (2013.01); *E04F 2201/0146* (2013.01); *E04F 2201/0153* (2013.01); *E04F 2201/023* (2013.01); *E04F 2201/042* (2013.01); *E04F 2201/043* (2013.01)

(58) Field of Classification Search
CPC ........ E04F 2201/0153; E04F 2201/023; E04F 2201/043; E04F 15/0215; E04F 15/082
USPC ........................................................ 52/309.3
See application file for complete search history.

(56) References Cited

U.S. PATENT DOCUMENTS

| | | | | |
|---|---|---|---|---|
| 6,490,836 | B1* | 12/2002 | Moriau ................ F16B 5/0016 | |
| | | | | 52/592.1 |
| 7,444,791 | B1* | 11/2008 | Pervan .............. E04F 15/02044 | |
| | | | | 52/592.2 |
| 9,194,135 | B2* | 11/2015 | Pervan .............. E04F 15/02194 | |
| 9,896,851 | B1* | 2/2018 | Collins ................... B32B 9/042 | |
| 10,508,457 | B2* | 12/2019 | Hannig ...................... A61F 5/56 | |
| 10,563,411 | B2* | 2/2020 | Patki ..................... E04F 15/107 | |
| 10,677,275 | B1* | 6/2020 | Caselli ................. E04F 15/087 | |
| 10,731,682 | B1* | 8/2020 | Caselli ................. E04F 15/087 | |
| 10,760,285 | B2* | 9/2020 | Patki ........................ B32B 3/06 | |
| 10,822,810 | B2* | 11/2020 | Patki ................ E04F 15/02038 | |
| 11,326,357 | B2* | 5/2022 | Patki ..................... B32B 27/304 | |
| 11,339,576 | B2* | 5/2022 | Caselli ...................... B32B 3/30 | |
| 11,346,113 | B2* | 5/2022 | Patki ...................... C04B 33/24 | |
| 11,359,386 | B2* | 6/2022 | Caselli ................. B32B 27/304 | |
| 2002/0007609 | A1* | 1/2002 | Pervan ..................... E04F 15/04 | |
| | | | | 52/592.2 |
| 2002/0020127 | A1* | 2/2002 | Thiers ...................... E04C 2/10 | |
| | | | | 52/578 |
| 2004/0170818 | A1* | 9/2004 | Stucky ................... C08J 9/0085 | |
| | | | | 428/304.4 |
| 2004/0177584 | A1* | 9/2004 | Pervan ...................... B27F 1/04 | |
| | | | | 52/592.1 |
| 2004/0213946 | A1* | 10/2004 | Miller ................... B32B 17/062 | |
| | | | | 428/57 |
| 2005/0138881 | A1* | 6/2005 | Pervan ..................... E04F 15/02 | |
| | | | | 52/581 |
| 2006/0065993 | A1* | 3/2006 | Stucky ................... B29C 48/022 | |
| | | | | 521/50 |
| 2006/0154015 | A1* | 7/2006 | Miller ...................... B32B 9/042 | |
| | | | | 428/50 |
| 2006/0293418 | A1* | 12/2006 | Matuana ............... B29C 48/022 | |
| | | | | 524/13 |
| 2008/0184646 | A1* | 8/2008 | Alford ..................... E04F 13/14 | |
| | | | | 52/582.1 |
| 2009/0133353 | A1* | 5/2009 | Pervan ..................... H01F 7/122 | |
| | | | | 52/747.1 |
| 2009/0223162 | A1* | 9/2009 | Chen ........................ E04F 15/02 | |
| | | | | 52/588.1 |
| 2009/0260313 | A1* | 10/2009 | Segaert ................... B44C 5/043 | |
| | | | | 52/592.1 |
| 2010/0293879 | A1* | 11/2010 | Pervan .............. E04F 15/02038 | |
| | | | | 52/588.1 |
| 2010/0300027 | A1* | 12/2010 | Bravo ................... E04F 15/087 | |
| | | | | 52/311.1 |
| 2013/0104485 | A1* | 5/2013 | Meersseman ............. B27N 7/00 | |
| | | | | 428/53 |
| 2014/0000197 | A1* | 1/2014 | Pervan .............. E04F 15/02038 | |
| | | | | 52/309.1 |
| 2014/0349084 | A1* | 11/2014 | Patki ......................... E04B 1/82 | |
| | | | | 428/688 |
| 2016/0250835 | A1* | 9/2016 | Pervan ..................... B05D 5/02 | |
| | | | | 428/204 |
| 2016/0319554 | A1* | 11/2016 | Thiers .................. C04B 41/4578 | |
| 2016/0326744 | A1* | 11/2016 | Döhring ................. B32B 27/10 | |
| 2016/0347084 | A1* | 12/2016 | Clement ................. E04F 13/10 | |
| 2016/0375674 | A1* | 12/2016 | Schulte ................. E04F 15/045 | |
| | | | | 156/220 |
| 2017/0165936 | A1* | 6/2017 | Schulte ................. E04F 15/042 | |
| 2018/0023306 | A1* | 1/2018 | Meersseman ..... E04F 15/02033 | |
| | | | | 52/309.3 |
| 2018/0274246 | A1* | 9/2018 | Vandevoorde ........ E04F 15/107 | |
| 2019/0145108 | A1* | 5/2019 | Hannig .............. E04F 15/02038 | |
| | | | | 52/582.2 |
| 2019/0202178 | A1* | 7/2019 | Ziegler ................... B32B 21/08 | |
| 2020/0011071 | A1* | 1/2020 | Patki ........................ B32B 3/06 | |
| 2020/0141129 | A1* | 5/2020 | Patki ...................... E04F 15/0215 | |
| 2020/0141130 | A1* | 5/2020 | Patki ........................ B32B 3/06 | |
| 2020/0362571 | A1* | 11/2020 | Patki ........................ B32B 7/12 | |
| 2021/0079666 | A1* | 3/2021 | Caselli ................... B32B 27/30 | |
| 2021/0285237 | A1* | 9/2021 | Patki ..................... E04F 15/0215 | |
| 2022/0403669 | A1* | 12/2022 | Patki ........................ B32B 3/06 | |

FOREIGN PATENT DOCUMENTS

| | | | | |
|---|---|---|---|---|
| CN | 102421973 | B | 8/2015 | |
| CN | 205000580 | U | 1/2016 | |
| CN | 104160101 | B | 6/2017 | |
| EP | 3222795 | A1 | 9/2017 | |
| WO | WO-9747834 | A1 * | 12/1997 | ............... B27F 1/06 |
| WO | 2004/097141 | A2 | 11/2004 | |
| WO | 2009142365 | A1 | 11/2009 | |
| WO | 2010/072704 | A1 | 7/2010 | |
| WO | 2016/114710 | A1 | 7/2016 | |
| WO | 2017163193 | A1 | 9/2017 | |
| WO | 2008/097860 | A2 | 8/2018 | |
| WO | 2018/195002 | A1 | 10/2018 | |
| WO | 2018/211397 | A1 | 11/2018 | |
| WO | 2018/215550 | A1 | 11/2018 | |

OTHER PUBLICATIONS

International Search Report and Written Opinion for International (PCT) Application No. PCT/US2020/017696 mailed Jul. 8, 2020.

* cited by examiner

FLOOR ELEMENT FOR FORMING A FLOOR COVERING, A FLOOR COVERING, AND A METHOD FOR MANUFACTURING A FLOOR ELEMENT

CROSS-REFERENCE TO RELATED APPLICATIONS

This application is a National Stage Entry of, and claims priority to, PCT Patent Application No. PCT/US2020/017696 filed 11 Feb. 2020, which claims priority to PCT Application No. PCT/US2019/040083, filed on 1 Jul. 2019, the disclosures of which is are herein incorporated by reference in its entirety.

TECHNICAL FIELD

The present invention relates to a floor element for forming a floor covering, a floor covering, and a method for manufacturing a floor element.

More particularly, the invention is related to a floor element for forming a floor covering, wherein this floor element comprises a decorative layer made of a brittle material such as natural stone, glass or sintered ceramic materials like porcelain, earthenware or the like. The decorative layer can, for example, be a ceramic tile.

BACKGROUND

Traditionally, ceramic tiles are installed by laying them side by side on a surface such as a floor or wall. Typically, an adhesive compound is used to attach the tiles to the surface. Seams between the tiles are grouted. In this way, the tiles are bonded to a rigid surface, for example a concrete subfloor, thereby improving their impact strength. The bound with the subfloor, and thus also with the structure of the dwelling, also leads to a high attenuation of walking sounds, both in the room where the floor is installed, and in quarters below the respective room. The tiled surface is water impervious and hygienic, since it can be cleaned in a very wet manner. The step of installing the tiles with an adhesive is, however, labor intensive and represents a significant portion of the labor involved in a typical floor covering installation. Moreover, this installing technique requires a high professional competence in order to obtain a well levelled floor covering. Thus, due to the time and labor involved in the installation, it is typically quite costly to have tiles professionally installed.

To substitute an existing floor covering made of tiles, it is often necessary to break the tiles, regenerate the surface by removing the residues of adhesive and then install a new floor covering. Thus, the demolition of a floor covering made of tiles is a labor and time-consuming operation. If the aim of the restoration is to substitute only one or a few damaged tiles, this operation becomes also difficult, since the substitution of one tile preferably does not damage the adjacent tiles.

In recent years, manufacturers have attempted to produce do-it-yourself tiling solutions that are easier to install. Some examples of these attempts are shown in WO 2004/097141 and WO 2008/097860. The floor elements disclosed in those documents can be laid on a surface and mechanically coupled together to form a floor covering without the use of an adhesive, thereby reducing the labor and time of the installing phase. Such kind of floor covering is known as a floating floor covering. In particular, in these documents, a ceramic tile or natural stone slab is fixed to a support layer that comprises coupling elements configured to realize a coupling with coupling elements of an adjacent floor element, thereby forming a floor covering.

On the other hand, since such floor elements are not bonded to a common rigid surface, the impact strength and, consequently, the fatigue strength is significantly reduced. The floating installation may also give rise to louder walking noise. The joints between the tiles of WO 2008/097860 may be prone to water penetration especially upon wet cleaning. According to some embodiments of WO 2004/097141, grout may be applied in the joints available between adjacent floor elements, which may lead to water imperviousness of the respective joint.

To improve the impact resistance of ceramic tiles, US 2014/349084 suggests a tile with a composite build-up. In this composite tile, a reinforcing layer is arranged in between two ceramic layers or in between a ceramic layer and a polymer laminate. As example of a reinforcing layer, a fiberglass layer is mentioned. The installation of this tile is, however, still cumbersome. A bonding with an underlying subfloor is required, for example via a bottom layer with pressure sensitive adhesive or tack fast loop fabric so that the tile is substantially made solid with the subfloor for improving the impact strength. Moreover, a precise positioning of the tile is difficult.

WO 2010/072704 proposes a different type of reinforcing layer, namely a steel plate. This steel plate is adhered to the back surface of the ceramic tile or slab. Also here, the installation is, however, difficult. The installation is done by simply resting the tiles on a subfloor, so that a precise positioning of the tile is difficult and the floor covering results in a not well levelled surface and in a noisy and permeable floor covering.

The present invention aims in the first place to provide an alternative floor element, which, in accordance with several of its preferred embodiments, is directed to solve one or more of the problems arising in the state of the art.

BRIEF SUMMARY OF THE INVENTION

In a first aspect, the invention provides a floor element for forming a floor covering, the floor element comprising: a decorative layer comprising a ceramic material; an intermediate layer comprising a resin material that permeates a lower surface of the decorative layer; and a support layer arranged below the decorative layer, wherein the support layer comprises edges provided with coupling elements configured to realize a mechanical coupling with coupling elements of an adjacent floor element.

In another aspect, the present invention provides a floor covering comprising a plurality of floor elements as described herein.

In another aspect, the present invention provides a method for manufacturing a floor element comprising the steps of: providing a decorative layer made of a ceramic material; providing a support layer; providing a resin material for bonding the decorative layer and the support layer together; and pressing the decorative layer and the support layer together to form the floor element such that the resin material permeates the decorative layer.

In another aspect, the present invention provides the use of a resin material for bonding together a decorative layer made of a ceramic material and a support layer to form a floor element, the resin material having a viscosity less than 1000 mPas at 20° C.

In another aspect, the present invention provides a floor element comprising: a decorative layer made of a ceramic material, and a support layer arranged below the decorative layer, wherein the support layer comprises at least two couples of opposite edges, the opposite edges comprising coupling elements configured to realize a mechanical coupling with coupling elements of adjacent floor elements, wherein the first coupling elements at a first couple of opposite edges are configured for being coupled to the coupling elements of adjacent floor elements by means of an angling motion around a horizontal axis parallel to the respective edges, and wherein the second coupling elements at a second couple of opposite edges are configured for being coupled to the coupling elements of adjacent floor elements by means of a translational downward direction of the respective edges towards each other.

In another aspect, the present invention provides a floor element comprising: a decorative layer having density as expressed by surface weight of at least 10 kg/sqm, preferably at least 15 kg/sqm, and a support layer arranged below the decorative layer, wherein the support layer comprises at least two couples of opposite edges, the opposite edges comprising coupling elements configured to realize a mechanical coupling with coupling elements of adjacent floor elements, wherein the first coupling elements at a first couple of opposite edges are configured for being coupled to the coupling elements of adjacent floor elements by means of an angling motion around a horizontal axis parallel to the respective edges, and wherein the second coupling elements at a second couple of opposite edges are configured for being coupled to the coupling elements of adjacent floor elements by means of a translational downward direction of the respective edges towards each other.

These and other objects, features and advantages of the present invention will become more apparent upon reading the following specification in conjunction with the accompanying description, claims and drawings.

BRIEF DESCRIPTION OF THE DRAWINGS

The accompanying Figures, which are incorporated in and constitute a part of this specification, illustrate several aspects described below.

DETAILED DESCRIPTION OF THE INVENTION

Figure 1:
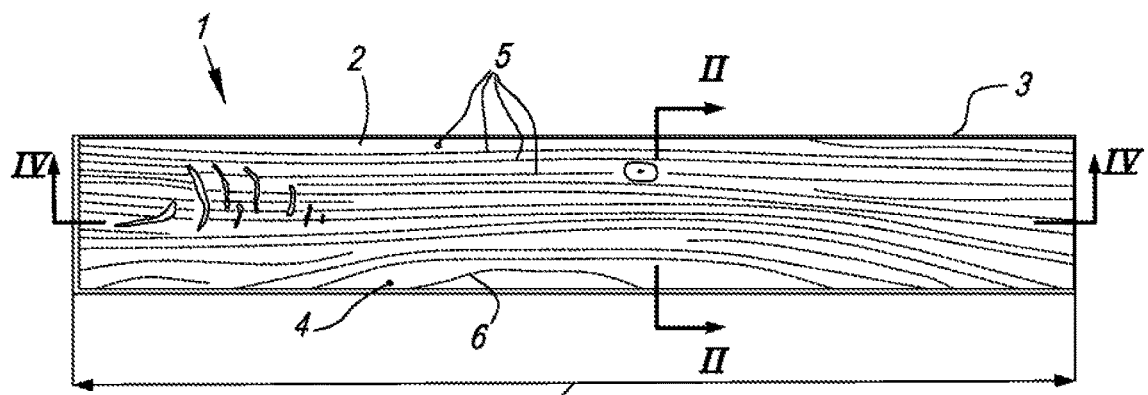
FIG. 1 shows a top view of an embodiment of a floor element of the invention.

Thus, the present invention, according to a first independent aspect, relates to a floor element for forming a floor covering, wherein this floor element comprises a decorative layer made of a ceramic material and a support layer arranged below this decorative layer, wherein the support layer comprises edges provided with coupling elements configured to realize a mechanical coupling with coupling elements of an adjacent floor element and wherein the floor element comprises an intermediate layer having a resin material that permeates a lower surface of the decorative layer. The inventors have found that, due to this solution, the impact resistance of the floor element, more particularly of the decorative layer of ceramic, is highly increased, so that, even with the mechanical locking between such floor elements, the impact strength achieves or even exceeds the impact strength of the traditional elements installed by means of adhesives. Moreover, with the claimed solution it is possible to improve the impact resistance of the floor element without the necessity to add further rigid or resilient reinforcing elements like rubber layer, fiberglass or metal plates. In fact, the resin permeating the pores of the decorative layer substantially improves the transmission and dissipation of the impact stress through the floor element so that a lower portion of said energy is absorbed by the decorative layer improving the impact resistance thereof. Since it is not necessary to add rigid reinforcing elements, the resulting floor element is lighter and thinner. Moreover, the resin constitutes a hinder to the propagation of cracks in the decorative layer itself. Furthermore, in case of superficial cracks of the decorative layer, the intermediate layer keeps the decorative layer itself coherent, and preferably compacted, thereby disguising the visual appearance of the superficial cracks.

Impact strength for flooring can be determined by means of a steel ball impact test. According to this test the impact strength is measured by dropping a steel ball on the floor element from a certain height, if the floor element does not break the height is increased until a height is reached where the steel ball breaks the floor element. The steel ball has a weight of 225.5 grams and a diameter of 38.1 mm (1.5 inches). The impact strength is expressed in terms of the maximum attainable height from which the steel ball, when dropped on the floor element does not break the floor element. The higher the drop height, the higher is the impact strength. The impact strength can be expressed in Joule (J), i.e. the energy of the steel ball when hitting the surface of the floor element. The inventors have found that traditional floorings, for example floorings made of porcelain floor elements with a thickness of approximately 10 mm, directly glued to a subfloor, usually show impact strength comprised between 1.68 J and 2.25 J (corresponding to a ball falling from a height comprised between 762 and 1016 mm) whereas known floating floors show an impact strength usually lower than 1.12 J (corresponding to a ball falling from a height lower than 508 mm). The inventors have found that, due to this solution, an impact strength above 5.62 J (corresponding to a fall of the steel ball from a height of above 2540 mm) can be achieved.

Fatigue strength for flooring is determined by means of the so-called Robinson Test according to ASTM C627. According to this test a three-wheel cart rotates about its center on top of a sample section of a tiles floor. Above each wheel is a rod along which weights can be stacked. A power motor drives the assembly and the cart rotates at a rate of 15 revolutions per minute. The test is run according to a loading schedule with 14 different cycles. For each cycle, the schedule specifies a type of wheel to be used (soft rubber, hard rubber, or steel), the amount of weight to be stacked above each wheel, and the total number of cart revolutions to be executed. After the completion of each cycle, the sample floor section is visually examined. The test result qualifies the floor according to the number of cycles passed without failure and indicates the following service level to which the floor is destined:

Sample completing cycles 1 through 3 without failure: "Residential" rating;
Samples completing cycles 1 through 6: "Light" commercial rating;
Samples completing cycles 1 through 10: "Moderate" commercial rating;
Samples completing cycles 1 through 12: "Heavy" commercial rating;
Samples completing all 14 cycles without failure are assigned in "Extra heavy" commercial rating.

The inventors have found that due to the use of the intermediate layer according to the invention, the Robinson Test can result in passing 6 cycles (Light Commercial) as minimum.

In accordance with a preferred embodiment of the invention, the decorative layer comprises a ceramic body, for example made of porcelain, red body ceramic, stoneware, earthenware, or other sintered ceramic powders. Preferably, the decorative layer is a ceramic tile or slab. The term "ceramic tile" includes an element with a substantially flat body consisting of baked minerals, such as clay, and preferably with a fired decorative top surface, preferably but not necessarily, on the basis of a glaze. The glaze has also the effect of preventing the resin permeating the decorative layer from reaching the upper surface of the decorative layer thereby affecting the appearance of the floor element.

It is noted, however, that this first aspect can be advantageously applied with decorative layers being made of any kind of material showing an open porosity at least in correspondence of its lower surface. Examples of said material can be brittle material, such as natural stone, concrete, glass or glass-ceramic material. The term brittle material is intended to include any material that breaks without significant plastic deformation. In particular, for the scope of this patent application, with the term brittle material is intended a material that of its own (if not bonded to a support layer and without any reinforcing element) has an impact strength lower than 1.68 J (corresponding to a ball falling from a height lower than 762 mm) according to the ball impact test.

According to a preferred aspect of the invention the decorative layer may comprise, at least in correspondence of its lower surface, an open porosity adapted to allow the resin to permeate the decorative layer itself. In fact, as already indicated above the inventors have surprisingly found that by making the resin of the intermediate layer permeating the pores of the decorative layer it is possible to significantly improve the transfer of the impact energy. Thus, according to a preferred embodiment of the invention the decorative layer comprises an apparent porosity between 0.1% and 10% determined according to ASTM C373, more preferably between 2% and 8%, for example 6%. The abovementioned ranges and values of apparent porosity provide the optimum balance between intrinsic mechanical properties of the decorative layer and the resin permeability thereof thereby optimizing the impact strength. In fact, the pores of the material, especially the closed pores that cannot be permeated by the resin may represent weak points of the material itself, therefore it is preferable that the decorative layer comprises an apparent porosity lower than 15%, preferably lower than 10% measured according to ASTM C373. Furthermore, the decorative layer may preferably have a volume of the open pores comprised between 0.01 cc (cubic centimeter) and 1 cc, more preferably between 0.10 cc and 0.90 cc, for example 0.60 cc. In this way the pores are big enough to be filled by the resin while at the same time they are sufficiently small to not compromise the mechanical properties of the decorative layer. This result is particularly impressive since t apparent porosity range is peculiar for ceramic tiles that are used mainly for wall covering or for floor covering in residential installations, but for floor covering of commercial installations where the traffic is more intense and higher mechanical properties are required, it is preferred the use of ceramic tiles having apparent porosity.

Thus, according to a first preferred possibility the decorative layer is made of porcelain. Porcelain is a ceramic material obtained by firing at high temperature, for example around 1200° C., a mixture of relatively pure raw material comprising clays, kaolin, quartz, feldspar, calcium carbonate and/or other mineral raw materials. Porcelain shows a very low apparent porosity, preferably less than 1%, for example 0.3% measured according to ASTM C373. Porcelain has a volume of the open pores comprised between 0.01 cc (cubic centimeter) and 0.1 cc, more preferably between 0.1 cc and 0.6 cc. Said porosity values are such that the porcelain material shows relatively high mechanical properties that can be further increased thanks to the resin permeating the decorative layer. In fact, a porcelain tile as such, i.e. when not bonded to a support layer and without the resin permeating the decorative layer, shows an impact resistance of 0.73 J, whereas a floor element comprising a decorative layer made of porcelain bonded above a support layer by means of an intermediate layer comprising a resin that permeates the lower surface of the decorative layer can reach an impact resistance up to 3.37 J.

Therefore, according to a second preferred possibility the decorative layer is made of a red body ceramic tile. Red body ceramic is a ceramic material obtained by firing at high temperature, for example around 1150° C., of a raw material mixture comprising clays, kaolin, quartz, feldspar, calcium carbonate and/or other mineral raw materials. Red body ceramic may be fired at lower temperature with respect to porcelain thereby showing a higher porosity and water absorption rate. Moreover, red body ceramic is obtainable starting from a raw material mixture that is cheaper than the raw material mixture that is necessary to obtain porcelain. For example, red body ceramic may comprise an apparent porosity comprised between less than 10%, preferably between 2% and 8%, for example 6% measured according to ASTM C373. Red body ceramic may have a volume of the open pores comprised between 0.10 cc and 0.90 cc, for example 0.60 cc. Usually a red body ceramic tile as such, i.e. when not bonded to a support layer and without the resin permeating the decorative layer, shows an impact resistance of 0.67 J, whereas a floor element comprising a decorative layer made of red body ceramic bonded above a support layer by means of an intermediate layer comprising a resin that permeates the lower surface of the decorative layer can reach an impact resistance up to 5.62 J. It is to be noted that a red body ceramic tile as such has an impact resistance lower than a porcelain tile as such, whereas a floor element according to the invention and comprising red body ceramic shows a significantly higher resistance than a floor element comprising porcelain.

The inventors have found that the interaction between the resin and the decorative layer is improved if the decorative layer comprises a lower surface that is substantially flat. The lower surface is the non-visible surface (in use) that is opposite to the upper decorative surface of the decorative layer. Usually, the lower surface of a ceramic tile comprises a back structure, generally formed by ribs or excavations, that can have a thickness up to 1 mm, but the inventors have found that for the application of the resin to the lower surface itself it is preferred to use a decorative layer that is free from said back structure, for example from said ribs. Furthermore, according to a preferred embodiment of the invention the lower surface of the decorative layer, in particular of the ceramic tile, is free from backwash. The backwash is a thin coating basically comprising an engobe that is applied, often non uniformly, to the lower surface of the ceramic tile and has the function of preventing the material of the non-fired ceramic tile from sticking onto the rollers of the firing kiln. Since the backwash comprises an engobe that is at least partially composed by a glass composition, during firing of the ceramic tile it melts permeating the pores of the ceramic tile that are open on the lower surface thereof so that the lower surface itself becomes impermeable. Thus, the inventors have found that a decorative layer made of a ceramic tile having a lower surface free from backwash provides a better resin permeability of the lower surface of the ceramic tile. It is also possible that the backwash covers a portion of the lower surface of the decorative layer that is lower to the 20%, preferably the 10% of said lower surface. In this way the backwash does not totally impermeabilize the lower surface allowing the resin to permeate said porosity of the decorative layer, while on the other hand helps the manufacturing of the decorative layer preventing the material of the non-fired ceramic tile from sticking onto the rollers of the firing kiln.

The decorative layer can have an upper face comprising a décor. The décor can be provided with a variety of textures, designs and colors. In a preferred embodiment, the décor simulates a natural product, such as natural stone or wood. Preferably, the décor is at least partially formed by a print. The print is preferably realized by means of digital printing, such as inkjet printing, although screen printing, rotogravure, flexography or off-set printing is not excluded. According to a variant, the décor is at least partially formed by uniformly colored base material or by a mix of colored base materials.

The decorative layer can comprise a background coating covering at least partially its upper surface and adapted to receive the décor on its top, for example adapted to receive the print on its top. The background coating can be white, beige, brown or of any color suitable to receive a décor on its top. In the case that the decorative layer is made of a ceramic material, the background layer preferably comprises at least a glaze covering the upper surface of the ceramic body.

The decorative layer can also comprise a protective coating covering at least partially its upper surface and being adapted to be placed above the décor. The protective coating can be transparent or translucent. The protective coating can be used in combination with the background coating. In the case that the decorative layer is made of a ceramic material, the protective layer preferably is a glaze.

Preferably, the decorative layer has a thickness comprised between 4 mm and 15 mm, preferably between 6 mm and 12 mm, more preferably greater than 7 mm, for example 8 mm or 10 mm. The inventors have found that by adding an intermediate layer a satisfying fatigue behavior can be achieved for a relatively thin decorative layer. Moreover, it is to be noted that said preferred values of thicknesses permit to find a good balance between weight and cost of the material on side, and mechanical resistance on the other side. Generally speaking, higher thicknesses correspond higher weight and higher cost but also higher mechanical resistance. Due to the reinforcing effect provided by the resin permeating the lower surface of the decorative layer it is possible to reduce the thickness of the decorative layer itself. Also, the rigidity of the decorative layer restrains the thermal expansion of the support layer, and this restraining effect is enhanced as the thickness of the decorative layer increases.

It is noted that the decorative layer may comprise density as expressed by surface weight of at least 10 kg/sqm, preferably 15 kg/sqm, for example more than 19 kg/sqm. High density of the decorative layer may improve installation of the floor covering and in particular a vertical locking of between the floor elements as it will be described below in more detail. It is also preferred that the decorative layer comprises a density as expressed by surface weight of less than 35 kg/sqm, preferably less than 30 kg/sqm, for example less than 25 kg/sqm. In fact, an excessively heavy decorative layer may affect the maneuverability of the floor element as well as complicating the packaging and the transportation thereof.

The decorative layer can be made of any shape, for example a squared, rectangular or hexagonal shape. In the preferred embodiment, the floor elements are rectangular and oblong in shape, and are preferably provided with a wood grain print depicting wood grain lines extending globally in the longitudinal direction of the rectangular decorative layer. The covering element may further comprise any dimension, although it is preferred that it comprises a superficial area of less than 1.5 sqm, preferably less than 1 sqm, more preferably less than 0.4 sqm.

In accordance with a preferred aspect of the invention the intermediate layer comprises a resin, for example a thermosetting resin or thermoplastic resin. Examples of thermosetting resin are epoxy, polyurethane, cyanoacrylate or acrylic resin. Examples of thermoplastic resin are hot melt, polyester thermoplastic, vinyl etc. Preferably the resin is a rigid resin. In fact, the inventors have found that a rigid resin, rather than flexible resin, improves the transfer of the impact energy between the layers. In particular, according to a preferred embodiment of the invention the intermediate layer comprises an epoxy resin. It is also preferred that the epoxy is a bicomponent resin, i.e. a thermosetting resin obtained by curing at low temperature (for example at room temperature) a mixture of two components, namely a resin and a hardener. When the two components of the resin are mixed together the curing reaction starts so that it is not necessary to activate the cure by providing external energy, like heat, UV or EB radiation. Said external energy could be optionally provided in order to accelerate the curing process. According to a preferred aspect of the invention the resin comprises a viscosity at 20° C. less than 1000 mPas, preferably less than 800 mPas, more preferably less than 600 mPas, for example approximately 400 mPas. Values of viscosity expressed in the present application are referred to dynamic viscosity and can be measure with torsional rheometer like, for example those of Anton Paar Physica MCR series. Within the scope of the invention viscosity means the viscosity of the uncured resin, for example the viscosity of the mixture of the two components before the completion of the curing, i.e. during the so-called pot life. In fact, the inventors have found that if the resin is sufficiently fluid, during its application onto the back of the decorative layer, it can permeate the pores thereof extremely improving the bonding between the intermediate layer and the decorative layer. In practice the when the resin permeates the pores of the decorative layer it substantially forms a "composite polymer-ceramic layer" that significantly improves the impact strength of the floor element. It is noted that, according to a preferred solution the resin is in a substantially liquid state during the manufacturing process of the floor element. In an alternative embodiment, the resin can be in a pasty or gel state during the manufacturing process, for example showing a thixotropic behavior in order to reach a sufficient fluidity to permeate the pores of the decorative layer under predetermined process conditions, for example during a pressing step. According to an embodiment of the invention the intermediate layer may comprise two or more different resins. For example, the intermediate layer may comprise a first resin for impregnating the pores of the decorative layer and a second resin for bonding together the decorative layer and the support layer. According to said embodiment the first resin may be a rigid resin for reinforcing the decorative layer and the second resin may be a for example a soft or elastomeric resin that provides a cushioning effect in case of impact.

The inventors have also found that preferably the resin may be free from fillers, like mineral fillers. In fact, the inventors have found that though the presence of fillers can on one hand improves mechanical properties of the resin as such, on the other hand the fillers can increase the viscosity of the resin thereby forming an obstacle to the permeation of the decorative layer.

The resin preferably comprises a tensile strength between 50 and 90 MPa, more preferably between 60 and 80 MPa, for example 75 MPa. It is noted that the resin preferably comprises a compressive strength between 90 and 130 MPa, more preferably between 100 and 120 MPa, for example 110 MPa. The inventors have found that such strength is sufficient to provide a rigid matrix for the composite polymer-ceramic layer that allows dissipation of the impact energy. It is also noted that the resin may preferably show a hardness value of at least 50 measured on a Shore D scale.

Preferably the resin covers at least a portion of the lower surface of the decorative layer, for example the majority, i.e. at least 50 percent, of the lower surface of said decorative layer. More preferably the resin covers 80 percent or more of the lower surface of the decorative layer, for example it covers the 100 percent of the lower surface of the decorative layer so that the effect of distribution and dissipation of the impact energy is obtained for an impact occurring in any point of the decorative layer.

The resin is preferably provided onto the lower surface of the decorative layer in an amount above 150 g/sqm, more preferably above 200 g/sqm, for example 220 g/sqm so that the resin it's in an amount that is sufficient to fully permeate the open pores of the lower surface of the decorative layer.

It is also preferable that the resin is provided in an amount sufficient to overflow from the open porosity of the decorative layer in order to act as a glue for the support layer. In other words, it is preferable that the resin partially permeates the open porosity of the decorative layer and partially coats the lower surface thereof for forming the intermediate layer and improving the transfer of energy. Said effect of transfer of energy is further improved if the support layer is directly fixed to the intermediate layer and, in particular, to said portion of the resin that coats the lower surface of the decorative layer, so that the intermediate layer acts as an adhesive layer that bonds together the decorative layer and the support layer.

Further, the intermediate layer may comprise a reinforcing element. The reinforcing element may be embedded into the intermediate layer, for example embedded into the resin material or may be a reinforcing layer placed between the intermediate layer and the support layer. The reinforcing element may comprise fibers like glass fibers carbon fibers, polymeric fibers, for example aramid or polyamide fibers, or ceramic fibers, for example boron or silicate fibers. The fibers may be woven or non-woven fibers, for example with fibers disposed at different orientations, and may be in in form of mat, fleece or cloth. Said reinforcing element may be used to further improve the impact resistance of the floor elements especially in case of special and peculiar installation like raised floors.

According to an alternative embodiment the reinforcing element may comprise a metal plate, for example a steel or aluminum plate. Preferably, the metal plate is configured to establish a compressive state in the decorative layer. In this way, since the decorative layer is in a compressive state, the impact resistance is strongly improved, because the compression obstacles the propagation of cracks and helps in disguising the visual effect of superficial cracks. To achieve this goal, the metal plate is first stretched, for example by means of a mechanical or thermal stretching, and then is bonded to the decorative layer while the metal plate is in the stretched state. Subsequently, the stretch is released, by interrupting the mechanical solicitation or by cooling the metal plate itself, thereby establishing a compressive state in the decorative layer. For example, embodiment, the metal plate has a coefficient of thermal expansion higher than the coefficient of thermal expansion of the decorative layer. Due to this solution, the reinforcing element is heated to a stretched state, and then it is bonded to the decorative layer while it is still in the stretched state and subsequently it is cooled down to retract and put the decorative layer in compression.

According to a preferred embodiment of the invention, the support layer is made of a material that is different from the material of the decorative layer. Particularly, the support layer is preferably made of a material adapted to be provided with coupling elements and/or made of a waterproof material and/or made of a compressible material.

The support layer is preferably made of a polymeric material. Polymeric materials have good mechanical properties in combination with relative low cost and low weight and, further, they provide for an impermeable and a sound reducing support layer. The expression "preferably made of a polymeric material" does not necessarily mean that the support layer is made exclusively by a polymeric material. For example, it is possible that the support layer can comprise fillers like fibers, strands, whiskers or particles, made of polymeric or non-polymeric material. Moreover, the term does not necessarily mean that the polymeric material represents the majority of the material in the support layer, e.g. more than 50% in weight. The term generally means that the polymeric material represents the matrix surrounding and binding together said filler.

Preferably, the support layer is made of a thermoplastic polymeric material. Preferred examples of thermoplastic materials include, e.g., PVC (polyvinyl chloride), polypropylene (PP) or polyurethane, more particularly thermoplastic polyurethane. Preferably, said thermoplastic polymeric material has a glass transition temperature (Tg) less than 100° C. Forming the support layer out of a material with a relatively low glass transition temperature leads to a support layer which is easily compressed at room temperature. Compression is desirable in many respects. For example, a possible thermal expansion of the support layer may be partially or wholly suppressed by the more rigid or stiffer decorative layer and/or reinforcing element that holds the material of the support layer in its original dimension.

Compression can also be important for the design of the coupling elements and can allow for a certain adaptation to unevenness of the subfloor, which in its turn prevents air chambers in between the support layer and the subfloor that may amplify walking noises.

Among the thermoplastic materials, PVC is a preferred choice for the support layer due to the balance between processability, physical and mechanical properties and cost. Moreover, the inventors have found that PVC show a good affinity with resin, in particular with epoxy resins, so that it is possible to form a very good bonding and interphase between the support layer and the intermediate layer. This interphase improves the transfer of impact energy between the layers of the floor element thereby improving impact strength thereof. Moreover, the inventors have found that due to the interaction between PVC and resin, epoxy in particular, it is possible to reduce or avoid any delamination effect between the support layer and the intermediate layer, and this has the consequence of improving the fatigue resistance of the floor element. In fact, since said good interaction can prevent delamination between the decorative layer and the support, with the consequence that the floor element can maintain substantially unaffected its mechanical properties even after prolonged solicitation, thereby showing good fatigue strength.

In a preferred embodiment, the support layer is made either of a rigid or of a flexible PVC, wherein rigid PVC comprises an amount of plasticizer less than 15 phr, and flexible PVC comprises an amount of plasticizer of 15 phr or more, preferably more than 20 or more than 25 phr. Within the context of the present description, "rigid" means that the support layer, taken alone, bends under its own weight less than 10 cm per meter and still better less than 5 cm per meter, whereas the term "flexible" means that the support layer, taken alone, bends under its own weight more than 10 cm per meter. The support layer may also comprise filler materials, such as mineral particles, for example chalk and or calcium carbonate. Said filler can be comprised in the support layer in a relatively high amount, e.g. more than 30 wt % or more than 60% wt of such filler materials. The fillers add weight to the support layer and make the support layer very effective in killing or reducing the transit of walking sound to lower quarters. Rigid PVC comprising fillers is also known as SPC (solid polymer composite). The content of filler should be preferably limited to below 70 wt %, for example below 50 wt % in order to not excessively increase the brittleness of the support layer. Rigid PVC provides for a support layer having good dimensional stability when exposed to temperature variation. In other words, the expansion of the support layer, when exposed to high temperature, is limited thereby providing a good stability of the floor. Preferably, the rigid PVC comprises a thermal expansion coefficient less than 85 μm/m per ° C., preferably less than 60 μm/m per ° C. for example 50 μm/m per ° C. For example, thermal expansion coefficient of the support layer, especially in case it is made of rigid PVC, is comprised between 20 μm/m per ° C. and 85 μm/m per ° C., preferably between 40 μm/m per ° C. and 60 μm/m per ° C. A support layer made of flexible PVC has a lower dimensional stability but is more easily compressed and therefore its tendency to expand will be suppressed at least to some extent by the decorative layer and/or the intermediate layer.

The inventors have found that good results in terms of impact strength are achievable by means of a support layer made of rigid polymeric material, preferably PVC. Therefore, according to a preferred embodiment, the support layer is made of a rigid polymeric material, preferably PVC, that may comprise a flexural modulus between 1.5 and 3.5 GPa, for example, approximately 2.6 GPa. The support layer may also comprise a flexural strength between 60 and 90 MPa, for example approximately 76 MPa. Moreover, the support layer may comprise a compressive strength between 40 and 70 MPa, for example approximately 56 MPa. In fact, the inventors have found that the rigidity of the support layer helps absorbing the impact energy thereby improving the impact strength.

According to an alternative embodiment a support layer made of flexible PVC, or from any other material, thermoplastic or not, can be designed in such a way to compensate to variations of dimension due to variations of the temperature. For example, the support layer can be formed of a plurality of separated elements, for example strips, or can comprises grooves separating adjacent portions of the support layer thereby permitting the expansion of said portions without affecting the global stability of the floor. Said grooves are preferably, opened toward the lower surface of the support layer.

Furthermore, the support layer has preferably a thickness comprised between 2 and 7 mm, preferably less than 6 mm, more preferably about 4 mm or less. A thinner support layer provides for a lower cost and, and a higher thermal stability, in particular because the thermal expansion of a thinner support layer can be more effectively suppressed by the rigidity of the support layer. For example, a preferred embodiment of the invention provides for a support layer made of rigid PVC and showing a thickness of 4 mm, thereby representing a good solution in terms of thermal stability, noise reduction, low weight and low cost.

As also stated above, the inventors have found that the rigidity of the decorative layer helps suppressing the thermal expansion of the support layer, and that the rigidity of said layers depends on their thicknesses. Therefore, according to a preferred embodiment the decorative layer comprises a thickness that is equal or higher than the thickness of the support layer, preferably, the thickness of the decorative layer is at least 1 time, preferably 1.5 times, more preferably 2 times the thickness of the support layer.

The thickness of the floor element is less than 20 mm, preferably 18 mm or less, more preferably 13 mm or less. In this way, the thickness of the resulting floor element is relatively thin, so that the impact of the floor in the environment is reduced, especially in case of restoration of existing flooring. Moreover, in this way, the surface weight of the floor element is limited so that the packaging, the transport and the installation are made easier. For example, the surface weight of the floor element is at least 18 kg/sqm, preferably at least 21 kg/sqm. For example, in a preferred embodiment wherein the decorative layer is made of porcelain and comprises a thickness of 8.5 mm and wherein the support layer is made of PVC and comprises a thickness of 4 mm, the surface weight of the floor element is approximately 24 kg/sqm. Due to this there is a good balance between economy of transport and packaging and easiness of installation. In fact, a weight above said limits may help the coupling between two floor elements, especially improving a vertical locking between them.

It is to be noted that according to a preferred embodiment of the invention, the floor element comprises a ceramic decorative layer, preferably made of porcelain or red body ceramic, a support layer made of rigid PVC, and an intermediate layer comprising a resin permeating the lower surface of the decorative layer. Preferably the ceramic decorative layer has a thickness between 6 mm and 12 mm, more preferably 8 mm. Preferably, the support layer has a thickness less than 6 mm, more preferably 4 mm. This embodiment provides for a floor element having a particularly effective thermal stability so that the floor covering is not affected by temperature variation in the room. Moreover, this effect is achieved by a floor element having a thickness less than 13 mm. This value is relatively low and this provides advantages in packaging, cost and maneuverability.

As mentioned before, the support layer comprises edges with coupling elements configured to realize a mechanical coupling with coupling elements of an adjacent floor element. The term "mechanical coupling" includes a coupling that allows adjacent floor elements to be coupled to each other without the need for glue or the like. A mechanical coupling may be attained by means of profiled edge contours comprising coupling elements, mostly a male and a female part, that fit into each other. It is noted that, preferably, the coupling elements are configured such that said mechanical coupling results in a locking between said edges in vertical and/or one or more horizontal directions.

The coupling elements preferably comprise at least a male part and at least a female part, wherein such male and female part in the connected state of two such floor elements have been engaged into each other. The male and the female parts are preferably at least partially formed in the support layer. For example, the male and/or female part may be wholly formed in said support layer. Said male and female part in a connected state of two similar floor elements engage into each other to create a mechanical coupling between the respective edges, preferably resulting in a locking between said edges in vertical and/or one or more horizontal directions.

As used herein, the terms "horizontal" and "vertical" are expressed relative to a floor covering installed on a surface which is considered to be horizontal in its general meaning. Thus, when used regarding a single floor element which is a substantially flat element provided with a main plane, the terms "horizontal: and "vertical" are to be considered respectively equivalent to the terms "parallel with respect to the main plane of the floor element/installed floor elements" and "perpendicular with respect to the main plane of the floor element/installed floor elements".

Furthermore, in a coupled condition of two of said adjacent floor elements, the coupling elements cooperate and preferably form locking surfaces limiting the mutual movement of said floor elements in vertical and/or one or more horizontal directions. Preferably, in a coupled condition of two adjacent floor elements, first locking surfaces are formed limiting the mutual movement of said floor elements in a direction perpendicular to the coupled edges and in a substantially horizontal plane. Furthermore, in said coupled condition, second locking surfaces are formed limiting the mutual movement of said floor elements in a substantially vertical direction. Due to this solution, the floor elements can fluently be installed without the occurrence of unacceptable height differences between adjacent floor elements. Moreover, the floor elements are solidly coupled to each other to improve the fatigue behavior of the floor covering. Further, by limiting relative movement of the floor element, it is possible to reduce the step noise effect, i.e. reduce the noise generated at every step.

According to a preferred embodiment of the invention, the male part and female part can be disposed substantially along the whole length of the related edge, for example, substantially defining the related edge. For example, according to this embodiment, the male and the female parts can be basically shaped as a tongue and a groove that substantially run through the whole length of the related mutually opposite edges. Preferably, the male part is positioned at a first edge of the floor element and at least the female part is positioned at a second opposite edge of the floor element.

Alternatively, the male part and the female part may extend over a limited length portion of the related edge, wherein such limited length is smaller than the whole length of the related edge itself, preferably smaller than half the length of the related edge. In accordance with this possibility, the edges preferably comprise sections free from said male part and said female parts. Geometries for coupling parts in accordance with this alternative embodiment include cooperating male and female parts which in a top plan view are dovetail-shaped or male and female parts which in a top plan view resemble the connections of jigsaw puzzles.

In some embodiments the coupling elements are configured so that, in a coupled condition, a pretensioned state is established between the coupling element. In other words, the coupling element are configured so that in the coupled condition they are elastically deformed thereby exerting a counter reaction to each other. Due to this solution the coupling between the floor element is strengthen and the coupling itself helps the waterproofing of the floor covering.

According to a preferred embodiment of the invention the coupling elements are configured so that, in a coupled condition, the coupling is free from pretension so that the coupling is simplified, and a lower force needs to be exerted by the operator. In other words, in the coupled condition the coupling elements are in an undeformed condition. Moreover, also the coupling movement of the coupling element, i.e. the relative movement between the coupling elements that allows the mechanical coupling, occurs without deformation of the coupling elements. For example, in some embodiments, in the coupled condition, a play is established between the coupling elements so that tiny movements between the coupling elements in a vertical and/or horizontal direction are admitted. For example, the dimension of the male part on a plane orthogonal to the respective edge is equal or slightly smaller than the dimension of the female part on the same plane.

The coupling elements are configured to allow realizing a coupling by means of a movement of one floor element with respect to another adjacent floor element. Such movement may be a translational motion in a downward, e.g. vertical, direction, a translational motion in a horizontal direction, e.g. perpendicular to the edges or an angling motion around a horizontal axis parallel to the edges. The respective motion then preferably results in the aforementioned male and female parts of adjacent floor elements becoming mutually engaged.

Thus, the coupling elements may be construed in accordance with several different possibilities, of which here below two are shortly described.

According to a first possibility, said coupling elements are configured for being coupled each other by means of an angling motion around a horizontal axis parallel to the edges. According this first possibility, it is also preferred that the coupling element are configured for being coupled by means of a translational motion in a horizontal direction, e.g. perpendicular to the edge. According to said first possibility the male and female parts are respectively shaped in form of tongue and groove, wherein the tongue projects outwardly beyond its respective edge in a horizontal direction and the groove projects inwardly with respect to the respective edge in a horizontal direction. As already indicated above the tongue and the groove are configured in such a way that in a coupled condition of said tongue and groove the first and second locking surfaces are formed to limit relative movements of the floor elements in vertical and horizontal direction, and wherein said horizontal direction is perpendicular to the edge. According to a preferred embodiment, the tongue comprises a horizontal extending lip and a downward projecting hump. As a consequence, in this embodiment, the groove has a horizontal recess, for receiving the lip of the tongue, and an upward oriented hollow portion, for receiving the hump of the tongue, so that tongue can be fitted into the groove. It is also preferred that in a coupled condition the tongue fits into the groove in such a way that a horizontal inoperative space is established between the tip of the tongue, in particular of the lip thereof, and the bottom of the groove, in particular of the recess thereof. It is also preferred that in a coupled condition the tongue fits into the groove in such a way that a vertical inoperative space is established is established between the lower surface of the tongue, in particular of the lip thereof, and the groove, in particular the recess thereof. Due to this solution it is provided a tongue having a lip narrower that the groove so that the angling movement for coupling the floor elements is improved. It is also preferred that in the coupled condition the downward projecting hump of the tongue contacts the hollow portion of the groove, and the upper surface of the tongue contacts the groove. In particular, it is preferred that the lower surface of the tongue contacts the groove only in correspondence of the hump. Due to this interaction, said second contact surfaces are provided and, at the same time, coupling by angling movement is simplified because the lower contact surface that is formed only in correspondence of the hump of the tongue and not in correspondence of the lip thereof. In other words, the lip has more room inside the tongue for performing the angling movement.

Moreover, according to a preferred embodiment of this first possibility, in the coupled condition of the tongue and the groove is formed a play. Said play allows tiny movements in a vertical and/or horizontal direction, preferably in the horizontal direction. The play is such that the tongue and the groove can be coupled to each other without being deformed.

As a consequence of this, the effort exerted by the operator who wants to install the floor elements is significantly reduced, this is particularly important since the weight of the decorative layer if on one hand complicates the installation operations, on the other hands helps the locking between the floor elements. Therefore, a slightly slack in coupling due to the play is admitted and helpful for improving the easiness of installation. Preferably, said play is more than than 0.01 mm, preferably more than 0.03 mm. Moreover, said play is preferably less than 0.10 mm, for example less than 0.08 mm.

According to a second possibility, said coupling elements are configured for being coupled by means of a translational motion in a downward, e.g. vertical, direction. According to this second possibility the coupling elements comprise an upward-directed lower hook-shaped part which is situated on one edge, as well as a downward-directed upper hook-shaped part, which is situated on the opposite edge. The lower hook-shaped part defines an upward directed cavity forming a female part, whereas the upper hook-shaped part defines a downward-directed lip forming a male part. Once in a coupled position the downward-directed lip and the upward-directed cavity form the first locking surface for limiting mutual movement in a horizontal direction, e.g. perpendicular to the edge. Preferably the upper hook-shaped part and the lower hook shaped part, more preferably respectively the lip and the cavity, are configured so that in the coupled condition the second locking surface are formed to limit the mutual movement of the floor elements in the vertical direction. Specifically, the upper hook-shaped part and the lower hook shaped part are configured so that two sets of said second locking surfaces are formed, for example on opposite of the male part and the female part. Preferably, both the upper hook-shaped part and the lower hook shaped part comprise undercut portions so that in the coupled condition the first and/or the second locking surfaces are formed to limit the mutual movement of the floor elements. Moreover, the coupling elements according to said second possibility are configured to be deformed during the coupling movement. Preferably, the lower hook shaped part comprises a flexible lever portion configured to be deformed by the coupling off the upper hook-shaped part lower hook shaped part so that by means of said deformation it is possible the coupling of the undercut portions.

It is noted that the floor element may comprise the same coupling elements, i.e. according to the first or to the second possibility, on all its edges. According to a preferred embodiment of the invention, the floor element can comprise coupling elements of different shapes or of different dimensions on different edges. For example, a floor element can comprise coupling elements according to the first possibility on a first couple of opposite edges, e.g. in case of rectangular floor element the long edges, and coupling elements according to the second possibility on a second couple of opposite edges, e.g. the short edges. In other words, a rectangular floor element can comprise coupling elements adapted for being coupled by means of an angling movement on the long edges and coupling elements adapted for being coupled by means of a translational motion in a downward direction on the short edges. Due to this solution, the coupling between the floor elements is significantly simplified. In fact, due to the angling movement, for example provided by the tongue and groove, it is easy to align the long edges of the floor elements thereby simplifying the positioning and providing a strong coupling in both vertical and horizontal direction between the long edge, while the short edges can be easily coupled by means of a translational motion in a downward direction as a direct consequence of the coupling between the long edges. This is particularly advantageous in case of a heavy decorative layer, in fact once the coupling elements according to the first possibility, e.g. the tongue and the groove on the long sides, are coupled it is sufficient to let the floor element lay in the horizontal position to realize the mechanical coupling of the coupling elements according to the second possibility, e.g. on the short edges without the need of hammering or beating the floor element itself. This happens also in case the coupling elements according to the second possibility are deformed during the coupling since the weight of the decorative layer may be sufficient to cause said deformation.

Preferably, the support layer has a shape basically corresponding to the decorative layer, however, preferably, with one or more portions extending beyond the decorative layer. The support layer may also comprise one or more recesses extending underneath the decorative layer. The support layer preferably is a coherent element, wherein the support layer preferably covers the majority, i.e. at least 50 percent, of the lower surface of said decorative layer. For example, the support layer covers 80 percent or more of the lower surface of the decorative layer. More preferably the support layer completely covers the lower surface of the decorative layer (i.e. covers 100%), and in some embodiments may extend beyond the lower surface of the decorative layer. Alternatively, the decorative layer may only partially cover the upper surface of the support layer, preferably the majority, for example more than 50%, preferably more than 80%, for example 90% or more. According to a variant, the support layer comprises a plurality of separate adjacent support layer portions, in which case said plurality of support layer portions preferably covers at least 50 percent of the lower surface, or even 80 percent or more thereof.

Preferably the support layer is attached to the decorative layer in such a way to extend beyond at least one edge of the decorative layer, for example at least two edges of the decorative layer, preferably subsequent edges of the decorative layer, more preferably beyond all the edges of the decorative layer. In particular, according to a preferred embodiment, the decorative layer is mounted on the support layer in such a way that is centered onto an upper surface of the support layer, e.g. each upper edge of the support layer extends beyond the edge of the decorative layer of the same predetermined distance. It is also possible that the decorative layer is mounted on the support layer in an offset position relative to the upper surface of the support layer, so that the predetermined distance between the upper edge of the support layer and the edge of the decorative layer varies from edge to edge of the decorative layer. Said predetermined distance is at least 0.5 mm, more preferably 0.75 mm, for example 1 mm or 1.5 mm.

The floor element may comprise any dimension, although it is preferred that it comprises a superficial area of less than 1.5 sqm, preferably less than 1 sqm, more preferably less than 0.4 sqm. For example, the floor element, and in particular the decorative layer, comprises an edge having a maximum length of less than 1.5 m, preferably less than 0.9 m. In fact, the floor elements are destined to lay on a subfloor that may have irregularities like depressions or bumps that can affect the floor covering installation, the impact resistance and also the fatigue resistance of the floor elements. For floor elements having a reduced area it is reduced the effect of said irregularities as well as the probability of encounter said irregularities. Moreover, the decorative layer, especially in the case that is made of a ceramic material, may be slightly bowed so that there may be the same issues due to irregularities of the subfloor. The larger the side of the decorative layer is, the larger said bending is so that is preferred that the floor element, and the decorative layer, comprise a reduced superficial area.

According to a preferred embodiment of the invention, in a coupled condition of two of said floor elements an intermediate distance is preferably available between the respective upper edges of adjacent floor elements. Preferably, the decorative layer is mounted on the support layer in such a way that when the floor elements are in a coupled condition said intermediate distance is available between the edges of adjacent decorative layers, while the edges of the underlying support layer are coupled to each other by means of the available coupling elements. Due to this solution slight dimensional variations of the decorative layer of adjacent tiles may be tolerated. In the cases where the decorative layer is formed by one or more ceramic tiles, both unrectified tiles and rectified tiles may be selected, wherein unrectified tiles are preferred since they are less expensive than the rectified ones. Even when rectified tiles are selected, an intermediate distance of at least 1.5 millimeter, for example around 3 millimeters or more is preferred in case of unrectified tiles. In general, with brittle decorative layers, direct contact between the edges of the decorative layers of adjacent floor elements is best to be prevented in order to minimize the risk of breaking off edge portions upon installation, or upon use of the floor covering. The prevention of direct contact between the edges of the decorative layers also prevents squeaking noises from generating when the floor is walked upon. Further some decorative layers and/or support layers may expand or contract due to thermal variation. The available intermediate distance prevents that such expansion and contraction affect the stability of the floor. For example, the predetermined distance between the edges of the decorative layer and the upper edge of the support layers is the same on all the edges of the decorative layer, and is preferably half of the intermediate distance between the respective upper edges of adjacent floor elements in the coupled condition. This solution is especially preferred in case unrectified tiles are used because it simplifies the positioning of tiles that may have slightly different dimensions on support layers having the same dimensions.

The intermediate distance, or gap, between the decorative layers of adjacent floor elements can be further finished in several possible ways.

According to a first possibility, said intermediate distance between the floor elements can be filled by a grout thereby providing an impermeable floor covering. Preferably a polymeric and/or cement-based grout is used. The grout may be a flexible or rigid grout. A flexible grout may be for example a silicone-based grout whereas a rigid grout may be for example an epoxy-based grout or cement-based grout. Epoxy-based, and silicone-based are example of polymeric grout, other examples of polymeric grout are polyurethane-based or acrylic-based grout.

In a second possibility, the decorative layer can be at least partially, preferably completely, surrounded by a gasket so that in a coupled condition of two adjacent floor elements said gasket is compressed by the decorative layer of an adjacent floor element so to form a substantially water tight connection between the floor elements.

It is noted that the characteristic that the floor element comprises an intermediate layer having a resin material that permeates a lower surface of the decorative layer, forms an inventive idea irrespective of the presence of a support layer, and in particular of a support layer comprising edges with coupling elements configured to realize a mechanical coupling with coupling elements of an adjacent floor element. Hence, the present invention, according to a second independent aspect, relates to a floor element for forming a floor covering, wherein this floor element comprises a first decorative layer made of a ceramic material and a second layer arranged below this decorative layer, wherein the second comprises a resin material that permeates a lower surface of the decorative layer. According to this second independent aspect of the invention the floor element may optionally comprise a third support layer placed below the second layer. Moreover, optionally said third support layer may comprise one or more of the features of the support layer described above in relation to the first independent aspect. The decorative layer and the intermediate layer may comprise one or more of the features described above in relation to the first independent aspect.

As an example, a floor element according to said second independent aspect may be installed on a subfloor by means of a pressure sensitive adhesive layer, a tack fast loop fabric layer, (for example Velcro®). For example, the floor element may comprise a pressure sensitive adhesive layer placed below the second layer, for example a bi-adhesive layer covered by a covering sheet to be peeled out before installing the floor element onto the subfloor. Alternatively, the floor element may also be installed on a pressure sensitive adhesive underlayment. As a further example a floor element according to said second independent aspect may be installed on a subfloor by means of a tack fast loop fabric layer (for example Velcro®). In this case the floor element may comprise a third support layer comprising a loop and hook fabric adapted to interlock with an underlayment of the subfloor. Moreover, for example, the floor element according to said second independent aspect may be installed on a subfloor by means of magnetic means. In this case the floor element may comprise a third support layer comprising a magnetic and/or ferromagnetic material suitable to interact with a magnetic and/or ferromagnetic underlayment of the subfloor.

It is to be noted that the fact that the resin material may be used for forming a floor covering comprising a decorative layer, for example made of a ceramic material, and wherein the resin permeates a lower surface of the decorative layer, forms an inventive idea irrespective of the further characteristic of the floor element like, by way of example, the nature of the decorative layer and the presence of the support layer. Hence, according to a third independent aspect, the invention relates to a use of a resin material for bonding together a decorative layer made of a ceramic material and a support layer to form a floor element. Wherein the resin material may comprise one or more of the features of the support layer described above in relation to the first independent aspect. Also, the decorative layer and the support layer may comprise one or more of the features described above in relation to the first independent aspect.

According to a fourth independent aspect of the invention, there is provided a floor covering comprising a plurality of adjacent floor elements, wherein each floor element comprises a decorative layer of ceramic material and a support layer disposed below the decorative layer, wherein the floor covering comprises the combination of the following features: at least one floor element comprises a intermediate layer having a resin material that permeates a lower surface of the decorative layer; the floor elements comprise coupling elements configured to realize a coupling with coupling elements of adjacent floor elements; the floor covering comprises a grout filling an intermediate distance separating the decorative layers of the floor elements. Preferably the floor elements are separated from a subsurface, for example the subfloor, i.e. they are not bonded to the subsurface by means of adhesive or mechanical means. Due to this solution there is provided a floor covering composed of floor elements installed without using of adhesive, that shows a high satisfying impact and fatigue strength, and is totally impermeable. By means of the second aspect, the inventors have finally offered a solution to a long-felt need in the ceramic flooring world. They have provided an easy to be installed ceramic tile flooring, with a good impact strength and waterproofness. The floor elements of the first aspect, and the preferred embodiments thereof, may be used to form a floor covering in accordance with the present third aspect.

According to a preferred embodiment of the invention the floor covering comprises an under-layer disposed beneath the floor elements that is configured to act as a moisture barrier. Due to this solution it is possible to prevent the forming of mold underneath the floor elements. In combination or as an alternative to this solution, the under-layer can be configured to act as a noise barrier thereby reducing the noise generated by steps on the floor.

The invention further relates to a method for manufacturing the floor element, for example the floor element of the present invention. Therefore, according to a fifth independent aspect of the invention there is provided a method for manufacturing a floor element comprising the steps of: providing a decorative layer made of a ceramic material; providing a support layer; providing a resin material for bonding the decorative layer and the support layer together; pressing the layers together for forming the floor element such that the resin material permeates the ceramic layer. In this way it is provided a method that allows manufacturing of floor elements to be installed on a subfloor without glue or adhesive and that shows relevant impact and fatigue resistance. Moreover, said method allows the manufacturing of high resistance floor elements in a simple and effective way. In fact, since it is not necessary the use of rigid reinforcing element, the method comprise a reduced number of steps so that it is relatively quick, and it can be carried out by means of a relatively simple equipment. The obtained floor element preferably shows the characteristic of the previously described floor elements of the invention.

The step of providing the decorative layer may comprise a step of brushing and/or roughing the lower surface of the decorative. Said step of brushing and/or roughing has the goal of prepare the lower surface of the decorative layer to be permeated by the resin material. For example, in case the decorative layer is made of a ceramic material, said step of brushing and/or roughing aims to remove the backwash and/or the structure of the lower surface of the decorative layer. In this way, any decorative layer may be used for manufacturing the floor element without being necessary to manufacture a specific decorative layer for the floor element, for example without being necessary to manufacture a ceramic tile without the backwash and without the structure on the lower surface.

As already described, the support layer may comprise edges provided with coupling elements. Therefore, according to the preferred embodiment of the invention, the step of providing the support layer may comprise the step of providing a support layer comprising edges provided with coupling elements, i.e. the coupling elements are provided in the support layer during a separate process. Alternatively, the method for manufacturing the floor element may comprise a step of providing the coupling elements in the edges of the support layer. Said step of providing the coupling elements may comprising milling, molding or other techniques. Moreover, said step of providing the coupling elements may be conducted either before or after a step of placing the decorative layer above the support layer, for example either before said step of providing the resin or after said step of pressing.

The step of providing the resin comprises the step of applying a non-cured resin on at least a surface of the decorative layer and/or of the support layer. The resin material may be provided by means of rolling, spraying, curtain or other techniques. According to an embodiment of the invention the resin material is applied onto the upper surface of the support layer. According to an alternative embodiment the resin material is applied during multiple intermediate steps, for example a first amount of resin is applied onto the upper surface of the support layer in a first intermediate step and a second amount of resin is applied onto the lower surface of the decorative layer in a second intermediate step. This solution is preferred especially for manufacturing floor elements wherein the intermediate layer comprises a reinforcing element, for example a fiber. In fact, in this case a higher amount of resin may be necessary and multiple steps for providing the resin may be ideal to ensure the correct gluing between the layers, embedding of the reinforcing element and permeation of the decorative layer.

The step of providing the resin can comprise the step of mixing the components thereof, in case the resin is a bicomponent resin, for example a bicomponent epoxy. Said step of mixing may be executed during, i.e. contemporarily, or shortly before the step of applying the uncured resin. In fact, often the curing of the resin is activated by the mixing of its components and as a consequence the viscosity of the resin increases. Thus, it is preferable to delay as much as possible the start of the curing reaction in order to make easier to spread the resin onto the layers' surfaces and improve the permeation of the decorative layer. For example, according to a preferred embodiment of the invention, the resin is applied by means of spraying and the components are mixed during spraying, for example substantially in correspondence of a nozzle of the spray equipment.

Preferably, during the pressing step a pressure of at least 350 kg/sqm is exerted onto the layers, more preferably at least 370 kg/sqm. Said values have been found optimal to make the resin permeate the decorative layer. Moreover, these values have been found optimal for allowing the resin to reach a 100% coverage of the lower surface of the decorative layer, because in certain embodiment the resin is applied according to a pattern and then spread during said pressing step. Moreover, the inventors have found that by keeping the pressure for a prolonged pressing time it is possible to improve the permeation of the decorative layer, for example it is possible to obtain a higher penetration depth. Therefore, according to a preferred aspect of the invention the during the pressing step, the pressure is kept for a pressing time of more than 1 second, preferably more than 10 seconds, for example 30 seconds. This pressing time has been found optimal for allowing the resin to reach a satisfying coverage of the lower surface of the decorative layer, preferably the 100% coverage of said lower surface, in case the resin is applied according to a pattern. Moreover, especially in case of resin made of epoxy, said pressing time is sufficient for making the resin to start curing so that the decorative layer and the support layer at least partially adhere to each other and sliding between the layers during transportation of the floor elements after pressing is prevented.

It is to be noted that, if one hand, 100% resin coverage of said lower surface of the decorative layer is a desirable achievement, on the other hand it is important to prevent the resin to overflow beyond the edges of the decorative layer itself, more preferably to overflow on the coupling elements. In fact, if the resin overflows the coupling element then the coupling between the floor element can be adversely affected. To prevent this undesired overflow several measures can be adopted. According to a preferred measure, the decorative layer and/or the support layer can comprise one or more groove, respectively open on the lower surface or on the top surface, being adapted to collect a portion of the resin. In the case that said grooves are provided on the decorative layer they are realized in proximity of the edge of the decorative layer itself. In the case that said grooves are provided on the decorative layer they can be realized in a portion of the upper surface destined to be covered by the decorative layer, for example close to the edges of the decorative layer when the decorative layer is disposed on the support layer. In this case, preferably the grooves are parallel to said edges of the decorative layer. Alternatively or in addition, the grooves can be present in a portion of the upper surface that extends beyond the edges of the decorative layer. Preferably the grooves are parallel to said edges of the decorative layer. Preferably said grooves runs continuously along said edges.

The step of pressing may be conducted in any suitable way for applying a pressure to the decorative layer and/or the support layer in order to help the resin penetrate the decorative layer. Therefore, according to an embodiment of the invention the step of pressing may be a static pressing step wherein the layers enter into a mold of a static press so that they are subjected to a predetermined pressure by means of a punch of the press. In this way it is possible to keep the pressure for the predetermined pressing time to improve the permeation of the decorative layer. According to an alternative embodiment the step of pressing may be a lamination step wherein the layers run into a laminating equipment, for example under one laminating roller or belt, or between a couple of laminating rollers, so that they are subjected to a predetermined pressure. Since lamination is a continuous process it is possible to speed up the global manufacturing method while at the same time exerting a sufficient pressure onto the layers for the permeation of the decorative layer. During lamination the pressing time is a function of the advancing speed of the layers, therefore the advancing speed may be regulated in order to speed up the process while at the same time a sufficient pressing time is achieved.

Preferably, the method comprises a step of stocking the floor elements for a stocking time in order to allow the resin to at least partially cure before being, packaged, transported and/or used in a floor covering. Preferably the stocking time is such to allow the resin to be at least 70% cured, preferably 85% cured, more preferably fully cured. For example, said stocking time is at least 0.5 h, preferably more than 1 h, for example 2 h.

It is also further noted that the characteristic that a floor element can comprise coupling elements according to the first possibility on a first couple of opposite edges, and coupling elements according to the second possibility on a second couple of opposite edges, forms an independent inventive concept irrespective from other features of the floor element. Therefore, according to a sixth independent aspect the invention relates to a floor element comprising a decorative layer made of a ceramic material, and a support layer arranged below the decorative layer, wherein the support layer comprises at least two couples of opposite edges, the opposite edges comprising coupling elements configured to realize a mechanical coupling with coupling elements of adjacent floor elements, wherein the first coupling elements at a first couple of opposite edges are configured for being coupled to the coupling elements of adjacent floor elements by means of an angling motion around a horizontal axis parallel to the respective edges, and wherein the second coupling elements at a second couple of opposite edges are configured for being coupled to the coupling elements of adjacent floor elements by means of an translational downward direction of the respective edges towards each other. This combination of different typologies of coupling elements can be particularly advantageous in case of a heavy decorative layers, like ceramic stones or the like, in fact once the first coupling elements are coupled it is sufficient to let the floor element lay in the horizontal position to realize the mechanical coupling of the second coupling elements without the need of hammering or beating the floor element itself. This happens also in case the second coupling elements are deformed during the coupling since the weight of the decorative layer may be sufficient to cause said deformation. Once the first coupling elements are connected, the user can have the impression of simply drop off the floor elements for completing the coupling since no more efforts is required. It is noted that the floor element according to the sixth independent aspect may comprise one or more of the features described in relation to the first independent aspect.

It is noted, within the scope of this sixth independent aspect, the preferred embodiment comprises a decorative layer made of ceramic however, it is noted that this sixth aspect can be advantageously applied with decorative layers being made of any kind of relatively heavy material, such as natural stone, quartz, artificial stone, concrete, glass or glass-ceramic material. It is also noted that this sixth aspect can be advantageously applied with decorative layers having density as expressed by surface weight of at least 10 kg/sqm, preferably more than 15 kg/sqm, for example more than 19 kg/sqm, irrespective of the material forming the decorative layer.

The inventors have also found that the coupling of floor elements according to the sixth independent aspect is further simplified if in the coupled condition the first coupling elements are connected with play, for example a horizontal play. In fact, if on one hand the weight of the decorative layer simplifies the coupling of the second coupling elements once the first coupling elements are coupled, on the other hand it complicates said coupling of the first coupling elements, and in particular it complicates the maneuverability of the floor element. Therefore, the play helps said coupling at the first couple of edges. This effect is further enhanced if the play is larger than play is greater than 0.01 mm, preferably greater than 0.03 mm. Moreover, said play is preferably less than 0.10 mm, for example less than 0.08 mm. In particular, this effect can be further enhanced if the play is such that the first coupling elements may be coupled to each other without being deformed.

It is also to be noted that the idea that the floor element comprises a support layer made of rigid PVC, to improve the thermal stability of the floor element, forms an independent inventive idea irrespective of the presence of other features of the floor element itself, in particular of the presence of the intermediate layer permeating a lower surface of the decorative layer. Thus according to a seventh independent aspect the invention relates to a floor element comprising a decorative layer made of a ceramic material and a support layer arranged below this decorative layer with the characteristic that said support layer is made of rigid PVC. It is noted that the floor element according to the seventh independent aspect may comprise one or more of the features described in relation to the first independent aspect.

It is to be noted that said grooves for collecting the resin can form an inventive idea irrespective of the presence of other features of the floor element. Therefore according to an eighth independent aspect the invention relates to a floor element comprising a decorative layer, a support layer and an intermediate layer disposed between the decorative layer and the support layers, wherein said intermediate layer comprises a resin, with the characteristic that the decorative layer and/or the support layer comprise one or more grooves, adapted to collect a portion of the resin. It is noted that the floor element according to this eighth independent aspect may comprise one or more of the features described in relation to any other aspect of the invention.

Figure 2:
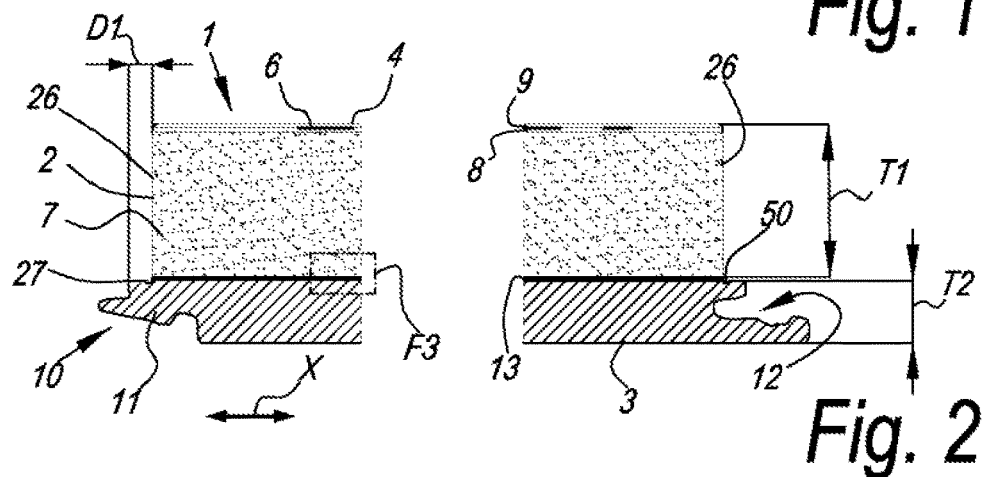
FIG. 2 on a larger scale shows a cross section along the line II-II of FIG. 1.
Figure 3:
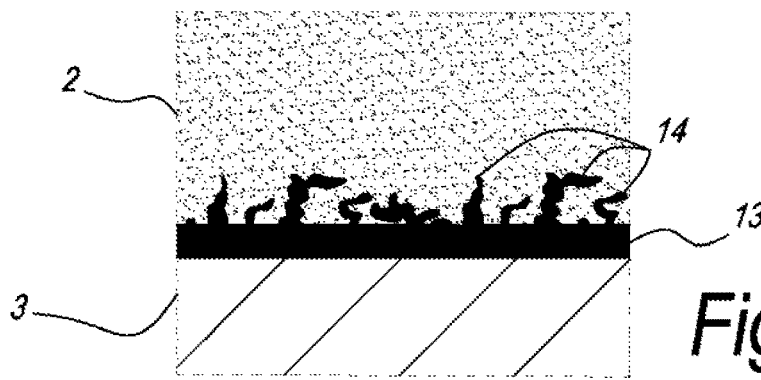
FIG. 3 on a larger scale shows a view on the area F3 indicated on FIG. 2.
Figure 4:
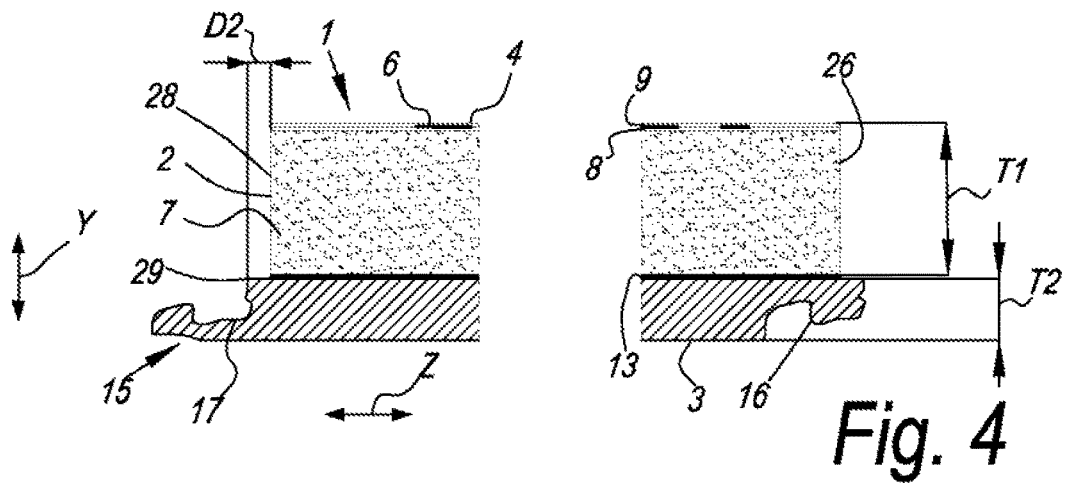
FIG. 4 on a larger scale shows a cross section along the line IV-IV of FIG. 1.
Figure 5:
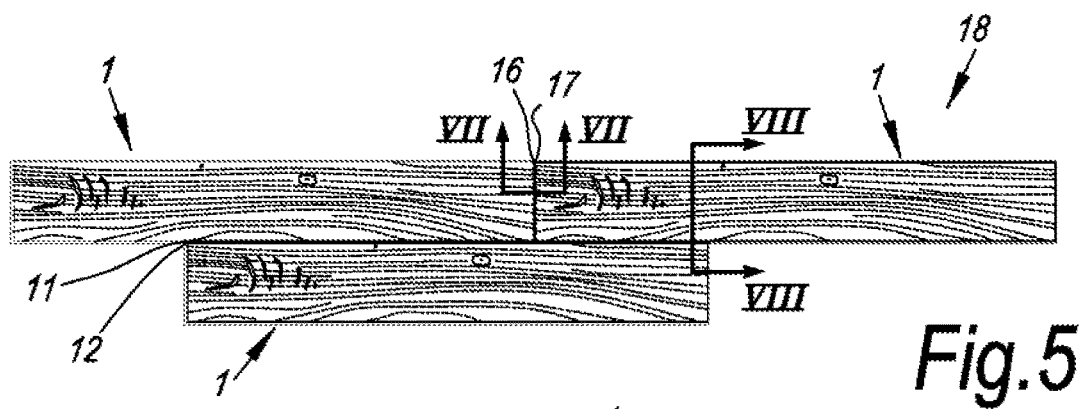
FIG. 5 on a smaller scale shows a top plane view of a floor covering comprising a plurality of the floor elements of FIG. 1.
Figure 6:
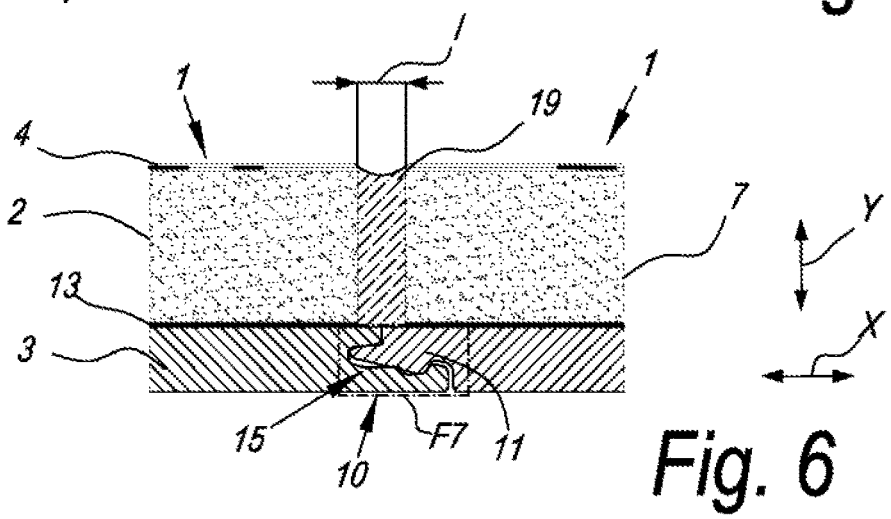
FIG. 6 on a larger scale shows a cross section along the line VII-VII of FIG. 5.
Figure 7:
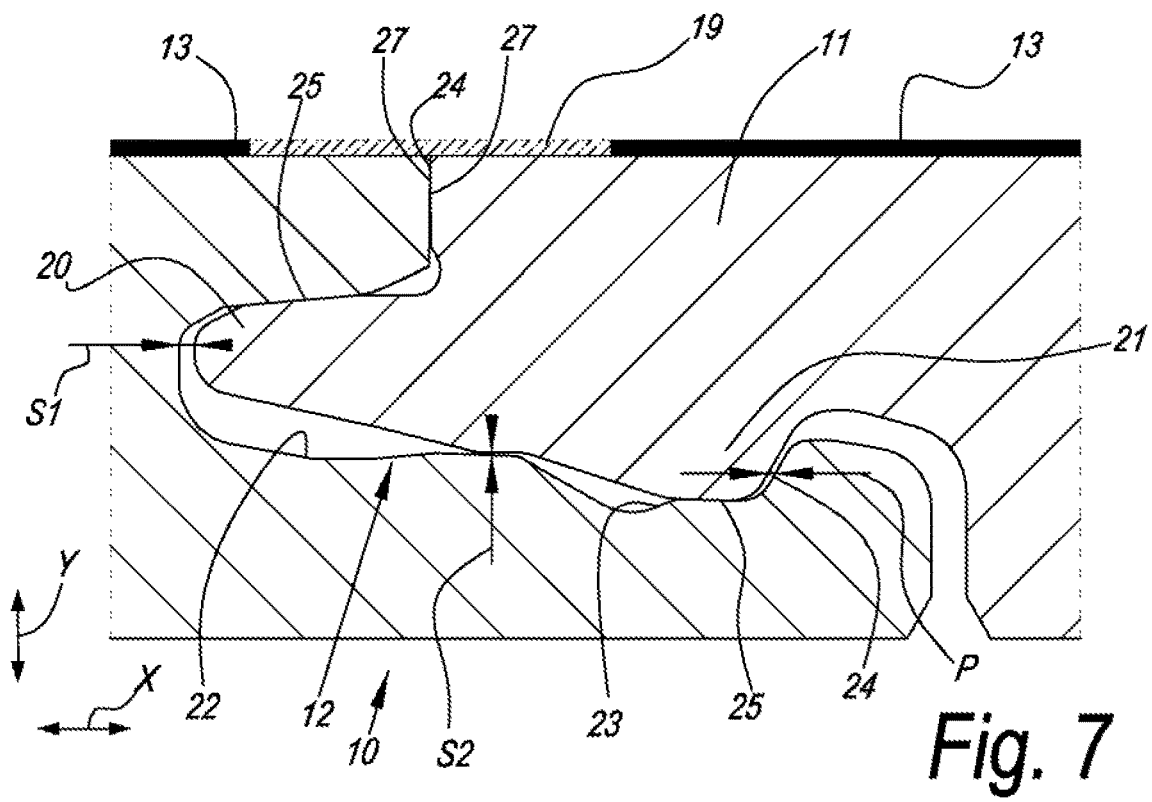
FIG. 7 on a larger scale shows a view on the area F7 indicated on FIG. 6.
Figure 8:
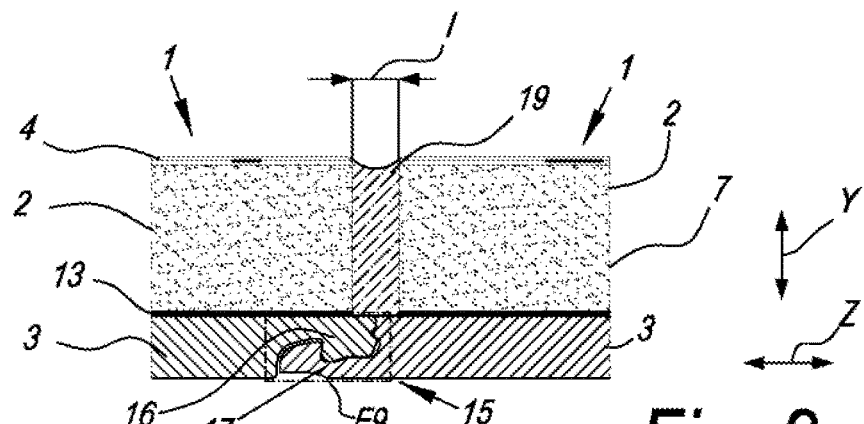
FIG. 8 on a larger scale shows a cross section along the line VIII-VIII of FIG. 5.
Figure 9:
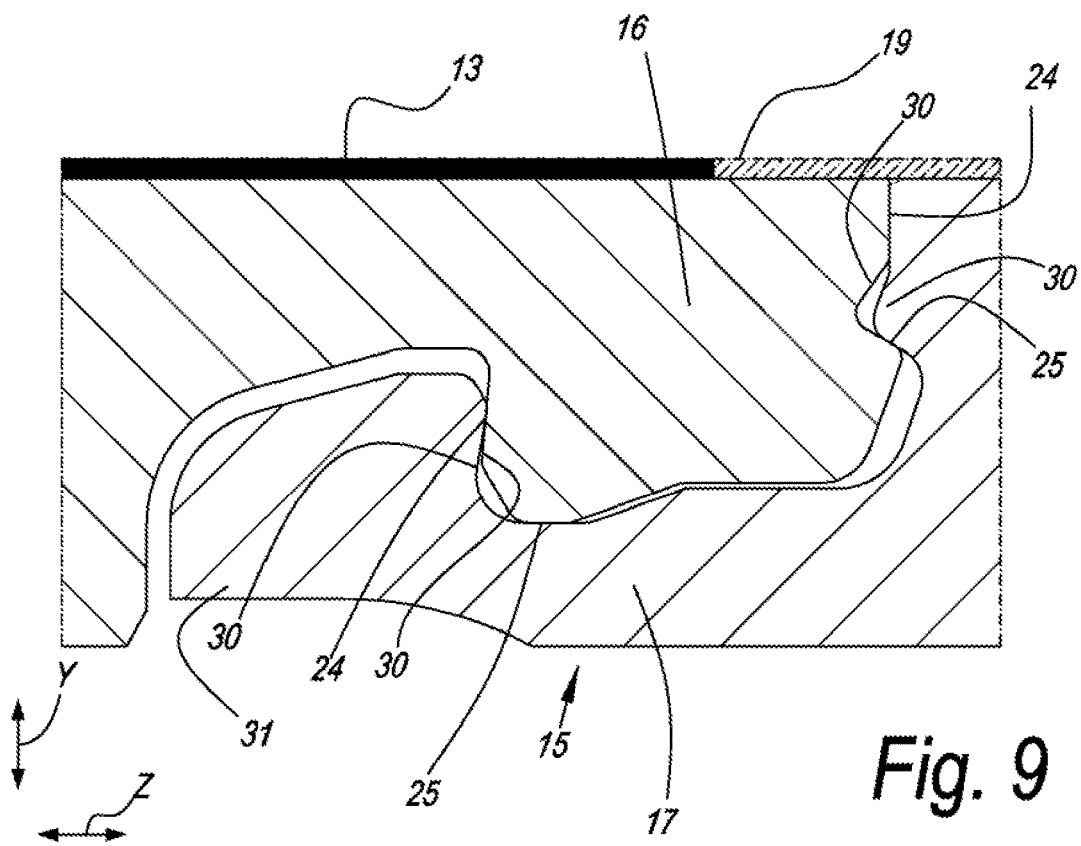
FIG. 9 on a larger scale shows a view on the area F9 indicated on FIG. 8.
Figure 10:
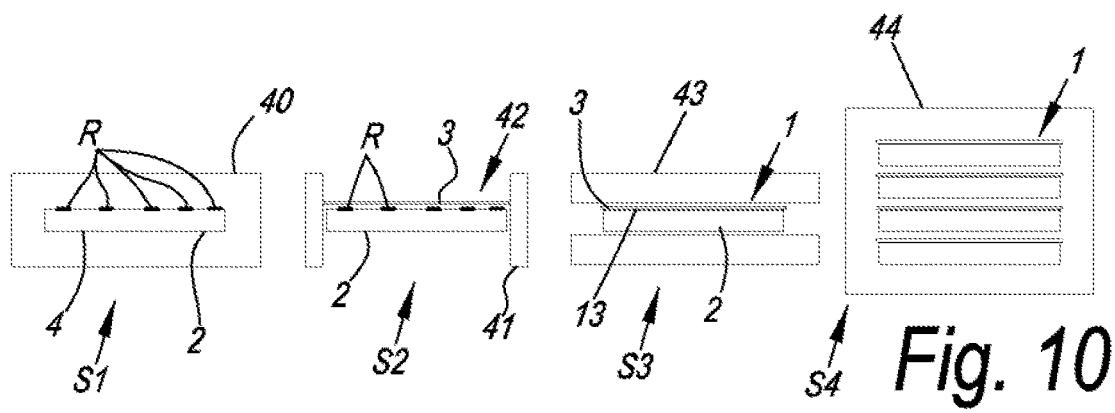
FIG. 10 shows some step of a method for manufacturing a floor element.

With the intention of better showing the characteristics of the invention, in the following, as an example without any limitative character, several preferred forms of embodiments are described with reference to the accompanying drawings, wherein:

FIG. 1 shows a top view of an embodiment of a floor element of the invention;

FIG. 2 on a larger scale shows a cross section along the line II-II of FIG. 1;

FIG. 3 on a larger scale shows a view on the area F3 indicated on FIG. 2;

FIG. 4 on a larger scale shows a cross section along the line IV-IV of FIG. 1;

FIG. 5 on a smaller scale shows a top plane view of a floor covering comprising a plurality of the floor elements of FIG. 1;

FIG. 6 on a larger scale shows a cross section along the line VII-VII of FIG. 5;

FIG. 7 on a larger scale shows a view on the area F7 indicated on FIG. 6;

FIG. 8 on a larger scale shows a cross section along the line VIII-VIII of FIG. 5;

FIG. 9 on a larger scale shows a view on the area F9 indicated on FIG. 8;

FIG. 10 shows some step of a method for manufacturing a floor element.

FIG. 1 shows a top view of an embodiment of a floor element 1 according to the invention. The floor element 1 comprises a decorative layer 2 disposed above a support layer 3.

As illustrated, the floor element 1 comprises a rectangular elongated shape. Preferably, the floor element 1 comprises a superficial area of less than 1.5 sqm, preferably less than 1 sqm, more preferably less than 0.4 sqm. For example, the decorative layer 2 comprises edges having a maximum length L of less than 1.5 m, preferably less than 0.9 m.

The decorative layer 1 has an upper face 4 comprising a décor 5. The décor 5 can be provided with a variety of textures, designs and colors. In the illustrated example the décor simulates a wood pattern comprising wood nerves and flakes. Preferably, the décor 5 is at least partially formed by a print 6. The print 6 is preferably realized by means of digital printing, such as inkjet printing, although screen printing, rotogravure, flexography or off-set printing is not excluded.

FIG. 2 on a larger scale shows a cross section along the line II-II of FIG. 1. According to the illustrated example the decorative layer 2 comprises a body 7 made of a ceramic material, for example red body ceramic or porcelain.

The decorative layer 2 comprises a background coating 8 covering at least partially the upper surface of the body 7, for example comprising at least a glaze. The background coating 8 is adapted to receive the décor 5 on its top, for example adapted to receive the print 6 on its top. The background coating 8 can be white, beige, brown or of any color suitable to receive the décor 7 on its top.

The decorative layer 2 further comprises a protective coating 9 covering at least partially the upper surface of the body 7, for example comprising at least a glaze. The protective coating 9 is adapted to be placed above the décor 5 and is transparent or translucent.

FIG. 2 also shows that decorative layer 2 has a thickness T1 comprised between 4 and 15 mm, for example 6 mm, preferably greater than 7 mm, for example 8 mm or 10 mm.

The support layer 3, according to the example, is made of a polymeric material, preferably a thermoplastic material like PVC. In the preferred embodiment, the support layer is made of a rigid PVC. Within the context of the present description, "rigid" means that the support layer, taken alone, bends under the own weight thereof less than 10 cm per meter and still better less than 5 cm per meter. The support layer 3 may also comprise a high amount of filler materials, such as calcium carbonate, e.g. more than 30 wt % or more than 60% wt of such filler materials.

Moreover, according to the preferred embodiment, the support layer 3 is made of a rigid PVC that may comprise a flexural modulus between 1.5 and 3.5 GPa, for example, approximately 2.6 GPa. The support layer 3 may also comprise a flexural strength between 60 and 90 MPa, for example approximately 76 MPa. Moreover, the support layer 3 may comprise a compressive strength between 40 and 70 MPa, for example approximately 56 MPa. Preferably, the support layer 3 has a thermal expansion coefficient comprised between 20 µm/m per ° C. and 85 µm/m per ° C., preferably between 40 µm/m per ° C. and 60 µm/m per ° C.

Furthermore, the support layer 3 preferably has a thickness T2 comprised between 2 mm and 7 mm, preferably less than 6 mm, more preferably about 4 mm or less.

FIG. 2 also shows that the support layer 3 comprises longitudinal edges 10 provided with first coupling elements 11,12 configured to realize a mechanical coupling with coupling elements 11,12 of an adjacent floor element 1. In the illustrated examples the coupling elements 11,12 comprise a male and female parts disposed on opposite longitudinal edges 10.

The first coupling elements 11,12 of the longitudinal edges 10 are configured for being coupled each other by means of an angling motion around a horizontal axis parallel to the longitudinal edges 10. The male and female parts are respectively shaped in form of a tongue 11 and a groove 12 wherein the tongue 11 projects outwardly beyond its respective longitudinal edge 10 in a horizontal direction X and the groove 12 projects inwardly with respect to the respective longitudinal edge 10 in said horizontal direction.

The support layer 3 extends beyond longitudinal edges 26 of the decorative layer 2. In the example, the support layer 3 comprises upper longitudinal edges 27 that extend beyond the longitudinal edge 26 of the decorative layer 2 of a distance D1. Said distance D1 is equal on both the opposite longitudinal edges 26 of the decorative layer 2.

FIG. 2 further shows that the floor element 1 comprises an intermediate layer 13 disposed between the decorative layer 2 and the support layer 3. The intermediate layer 13 comprises a resin material, for example a thermosetting resin or thermoplastic resin. Examples of thermosetting resin are epoxy, polyurethane, cyanoacrylate or acrylic resin. Examples of thermoplastic resin are hot melt, polyester thermoplastic, vinyl etc. Preferably the resin is a rigid resin. In particular, according to a preferred embodiment of the invention the intermediate layer comprises an epoxy resin. It is also preferred that the epoxy is a bicomponent resin, i.e. a thermosetting resin obtained by curing at low temperature (for example at room temperature) a mixture of two components, namely a resin and a hardener.

The resin preferably comprises a tensile strength between 50 and 90 MPa, more preferably between 60 and 80 MPa, for example 75 MPa. Moreover, the resin preferably comprises a compressive strength between 90 and 130 MPa, more preferably between 100 and 120 MPa, for example 110 MPa. It is also preferable that the resin shows a hardness value of at least 50 measured on a Shore D scale.

As illustrated the intermediate layer 13 covers 100 percent of the lower surface of the decorative layer 2. The resin is preferably provided onto the lower surface of the decorative layer 2 in an amount more than 150 g/sqm, more preferably more than 200 g/sqm, for example 220 g/sqm.

In the preferred example illustrated in FIG. 2, the intermediate layer 13 is in direct contact with the upper surface of the support layer 3 so that act as a glue between the decorative layer 2 and the support layer 3.

In the embodiment of FIG. 2 the support layer 3 comprise grooves 50 adapted to collect a portion of the resin of the intermediate layer 13 in case of overflow beyond the edges 26 of the decorative layer 2, in order to prevent said resin to overflow onto the coupling elements 11,12. In this embodiment said groove 50 are provided in the portion of the support layer 3 extending beyond the edges 26 of the decorative layer 2. Moreover, said grooves 50 extends parallel and continuously to the edges 26 of the decorative layer 2. For a reason of simplicity, the grooves 50 are not illustrated in other figures of the present application, anyway the can be present in any of the embodiment, for example they can be present, also in correspondence of the short edges of the floor element 1.

FIG. 3 on a larger scale shows a view on the area F3 indicated on FIG. 2. As illustrated in FIG. 3 the decorative layer 2, more in detail the body 7 thereof, comprises, at least in correspondence of its lower surface, an open porosity 14 adapted permeated by the resin of the decorative layer 2 itself.

Thus, according to a preferred embodiment of the invention the decorative layer 2 comprises an apparent porosity between 0.1% and 10% determined according to ASTM C373, more preferably between 2% and 8%, for example 6%. Furthermore, the decorative layer may preferably have a volume of the open pores 14 comprised between 0.01 cc (cubic centimeter) and 1 cc, more preferably between 0.10 cc and 0.90 cc, for example 0.60 cc.

Therefore, in order to properly flow into said open pores 14 the resin comprises a viscosity at 20° C. less than 1000 mPas, preferably less than 800 mPas, more preferably less than 600 mPas, for example approximately 400 mPas. Within the scope of the invention viscosity means the viscosity of the uncured resin, for example the viscosity of the mixture of the two components before the completion of the curing, i.e. during the so-called pot life.

FIG. 4 shows on a larger scale shows a cross section along the line IV-IV of FIG. 1. According to the embodiment the support layer 3 comprises transversal edges 15 provided with second coupling elements 16, 17 configured to realize a mechanical coupling with second coupling elements 16, 17 of an adjacent floor element 1.

In the illustrated examples the second coupling elements 16, 17 are different from the first coupling elements 11, 12 of the longitudinal edges 10. The second coupling elements 16, 17 of the transversal edges 15 are configured for being coupled each other by means of a translational movement along a substantially vertical direction. In the illustrated examples, said second coupling element 16, 17 are configured for being coupled by means of a translational motion in a downward, e.g. vertical, direction Y.

The support layer 3 extends beyond transversal edges 28 of the decorative layer 2. In the example, the support layer 3 comprises upper transversal edges 29 that extend beyond the transversal edge 28 of the decorative layer 2 of a distance D2. Said distance D2 is equal on both the opposite edges 28 of the decorative layer 2. Moreover, in said preferred example, said distance D2 is equal to the distance D1. For example said distances D1 and D2 are greater than 0.5 mm, preferably greater than 0.75 mm for example 1.5 mm.

FIG. 5 is a top plan view of a floor covering 18 comprising a plurality of floor elements 1 coupled by means of the first coupling elements 11,12 along the longitudinal edges 10 and by means of the second coupling elements 16,17 along the transversal edges 15.

FIG. 6 on a larger scale shows a cross section along the line VII-VII of FIG. 5. The floor covering 18 comprises a grout 19 filling an intermediate distance I separating the decorative layers 2 of the floor elements 1. According to the illustrated example, the intermediate distance I is twice the distance D1 between the upper edge of the support layer 3 and the edge of the decorative layer 3.

The grout 19 is preferably made of a polymeric material. The grout 19 may be a flexible or rigid grout. A flexible grout 19 may be for example a silicone-based grout whereas a rigid grout may be for example an epoxy-based grout or cement-based grout. Other examples of polymeric grouts are polyurethane-based and acrylic-based grouts.

FIG. 6 further shows a section of the mechanical coupling between the firsts coupling elements 11,12 along a plane transversal to the longitudinal edges 10. Said mechanical coupling between the firsts coupling elements 11,12 is described in detail with the aid of FIG. 7.

FIG. 7 on a larger scale shows a view on the area F7 indicated on FIG. 6. According to the preferred example illustrated in FIG. 7, the tongue 11 comprises a horizontal extending lip and a downward projecting hump 21. The groove 12 has a horizontal recess 22, for receiving the lip 20 of the tongue 11, and an upward oriented hollow portion 23, for receiving the hump 21 of the tongue 11, so that tongue 11 can be fitted into the groove 12.

In the coupled condition shown in FIG. 7 the upper edges 27 of the support layers 3 contact each other thereby forming a first set of first locking surfaces 24 limiting the mutual movement of said floor elements 1 in a horizontal direction X perpendicular to the coupled longitudinal edges 10.

FIG. 7 also shows that in said coupled condition, the lip 20 is received by the recess 22. The upper surface of the lip 20 contacts un upper wall of the recess 22 thereby forming a first set of second locking surfaces 25 are formed limiting the mutual movement of said floor elements 1 in a substantially vertical direction Y. It is noted that between the tip of the lip 20 and the bottom of the recess 22 is established a horizontal inoperative space S1. Moreover, between lower surface of the lip 20 and the recess 22 is established a vertical inoperative space S2.

The downward projecting hump 21 of the tongue 11 is received by the hollow portion 23 of the groove 12. The lower surface of the downward projecting hump 21 contacts said hollow portion 23 so that a second set of second locking surfaces 25 is formed. In other words, the lower surface of the tongue 16 contacts the groove 12 exclusively in correspondence of the downward projecting hump 21.

In the coupled condition of FIG. 7, between the projecting hump 21 and the hollow portion 23 is formed a horizontal play P that allows tiny horizontal movement of the tongue 11 into the groove 12. Said play P and said tiny horizontal movements are limited by a set of first contact surface that may be formed between the projecting hump 21 and the hollow portion 23.

Preferably, said play P is greater than 0.01 mm, preferably greater than 0.03 mm. Moreover, said play P is preferably less than 0.10 mm, for example less than 0.08 mm.

It is noted that in the coupled condition the tongue 11 and the groove 12 are in an undeformed condition. Further, the whole angling movement that allows the coupling between the tongue 11 and the groove 12 occur without deformation of the first coupling elements 11,12. In fact due to the play P and the inoperative spaces S1, S2 the coupling between the tongue 11 and the groove 12 is significantly simplified.

FIG. 8 on a larger scale shows a cross section along the line VIII-VIII of FIG. 5. FIG. 8 shows a section of the mechanical coupling between the second coupling elements 16,17 along a plane transversal to the transversal edges 15. Said mechanical coupling between the second coupling elements 16,17 is described in detail with the aid of FIG. 9.

FIG. 9 on a larger scale shows a view on the area F9 indicated on FIG. 8.

The second coupling element elements 16,17 comprise downward-directed upper hook-shaped part 16 is situated on one transversal edge 15 and d upward-directed lower hook-shaped part 17, which is situated on the opposite edge 15. The lower hook-shaped part 17 defines an upward directed cavity forming a female part, whereas the upper hook-shaped part 16 defines a downward-directed lip forming a male part.

Once in a coupled position the downward-directed lip and the upward-directed cavity form the first locking surface 24 for limiting mutual movement of the floor elements 1 in a horizontal direction Z perpendicular to the transversal edge 15.

Moreover, both the upper hook-shaped part 16 and the lower hook shaped part 17 comprise undercut portions 30 so that in the coupled condition the second locking surfaces 25 are formed to limit the mutual movement of the floor elements 1 in the vertical direction Y. More in particular, two sets of said second locking surfaces 25 are formed, for example on opposite sides of the male part and the female part.

Preferably, the lower hook shaped part 17 comprise a flexible lever portion 31 configured to be deformed by the coupling off the upper hook-shaped part 16 lower hook shaped part 17 so that by means of said deformation it is possible the coupling of the undercut portions 30.

FIG. 10 shows some steps of a method for manufacturing a floor element. The method comprises a first step S1 of providing the decorative layer 2. In the step S1 the decorative layer 2 is provided into a resin application station 40 wherein the uncured resin material R is provided, for example according to a pattern, onto a lower surface of the decorative layer 2. The uncured resin R preferably comprises a viscosity at 20° C. less than 1000 mPas, preferably less 800 mPas, more preferably less 600 mPas, for example approximately 400 mPas. It is noted that in the resin application station 40 the decorative layer is placed with the upper surface, comprising the décor 6, facing down.

Then, in a step S2 the decorative layer 2 is carried into a placing station 41 wherein the support layer 3 is provided. The support layer 2 is placed below the lower surface decorative layer 3 thereby forming a semi-finished sandwich 42. Preferably, in said placing station 41 the decorative layer 2 and the support layer 2 are properly centered relative to each other.

Successively, in a step S3 the semi-finished sandwich 42 is carried into a pressing station 43 wherein the layers 2,3 are pressed together for forming the floor element 1 such that the resin material permeates the pores of the ceramic material of the decorative layer 2 and forms the intermediate layer 13. Preferably, the pressure is maintained for a pressing time of at least 1 second, preferably 30 seconds so that the uncured resin R can flow covering, at least 80%, preferably 100% of the lower surface of the decorative layer 2. Moreover, said pressing time is necessary to let the uncured resin R permeates the decorative layer 2. Preferably, during step S4 a pressure of at least 350 kg/sqm is exerted onto the layers.

Then in a step S4 pressed floor element 1 is then carried into a stocking station 44 wherein for a predetermined stocking time in order to allow the resin R to continue curing before being, packaged, transported and/or used in a floor covering. Preferably the stocking time is such to allow the resin R to be at least 70% cured, preferably 85% cured, more preferably fully cured. For example, said stocking time is at least 0.5 h, preferably more than 1 h, for example 2 h.

The present invention is in no way limited to the hereinabove described embodiments, but such floor elements may be realized according to different variants without leaving the scope of the present invention. While several possible embodiments are disclosed above, embodiments of the present invention are not so limited. These exemplary embodiments are not intended to be exhaustive or to unnecessarily limit the scope of the invention, but instead were chosen and described in order to explain the principles of the present invention so that others skilled in the art may practice the invention. Indeed, various modifications of the invention in addition to those described herein will become apparent to those skilled in the art from the foregoing description. Such modifications are intended to fall within the scope of the appended claims.

What is claimed is:

1. A floor element comprising:
   a decorative layer made of a ceramic material; and
   a support layer arranged below the decorative layer, the support layer comprising rigid polyvinylchloride (PVC) and having a flexural modulus between 1.5 and 3.5 GPa,
   wherein the support layer further comprises at least two couples of opposite edges, each of the opposite edges comprising coupling elements configured to realize a mechanical coupling with coupling elements of adjacent floor elements,
   wherein first coupling elements at a first couple of the at least two couples of opposite edges are configured for being coupled to the coupling elements of adjacent floor elements by means of an angling motion around a horizontal axis parallel to respective edges of the first couple of the at least two couples of opposite edges,
   wherein second coupling elements at a second couple of the at least two couples of opposite edges are configured for being coupled to the coupling elements of adjacent floor elements by means of a translational downward direction of respective edges of the second couple of the at least two couples of opposite edges towards each other,
   wherein the mechanical coupling results in a locking between edges of the support layer and edges of the adjacent floor elements in a vertical direction and one or more horizontal directions,
   wherein the first coupling elements comprise a tongue and a groove such that a play is established between the tongue and the groove,
   wherein the play allows movement in a horizontal direction and is such that the tongue and the groove are coupled to each other without being deformed, and
   wherein the intermediate layer is an adhesive layer that bonds the decorative layer and the support layer together.

2. The floor element according to claim 1, wherein the second coupling elements comprise an upward-directed lower hook-shaped part which is situated on one edge of the second couple of the at least two couples of opposite edges, as well as a downward-directed upper hook-shaped part, which is situated on an opposite edge of the second couple of the at least two couples of opposite edges.

3. A floor element for forming a floor covering, the floor element comprising:
   a decorative layer made of a ceramic material;
   an intermediate layer having a resin material that permeates a lower surface of the decorative layer; and
   a support layer arranged below the decorative layer, the support layer comprising rigid polyvinylchloride (PVC) and having a flexural modulus between 1.5 and 3.5 GPa,
   wherein the support layer further comprises at least two couples of opposite edges provided with coupling elements configured to realize a mechanical coupling with coupling elements of adjacent floor elements,
   wherein the mechanical coupling results in a locking between edges of the support layer and edges of the adjacent floor elements in a vertical direction and one or more horizontal directions,
   wherein first coupling elements at a first couple of the at least two couples of opposite edges are configured for being coupled to coupling elements of adjacent floor elements by means of an angling motion around a horizontal axis parallel to respective edges of the first couple of the at least two couples of opposite edges,
   wherein second coupling elements at a second couple of the at least two couples of opposite edges are configured for being coupled to coupling elements of adjacent floor elements by means of a translational downward direction of respective edges of the second couple of the at least two couples of opposite edges towards each other,
   wherein the first coupling elements comprise a tongue and a groove such that a play is established between the tongue and the groove,
   wherein the play allows movement in a horizontal direction and is such that the tongue and the groove are coupled to each other without being deformed, and
   wherein the intermediate layer is an adhesive layer that bonds the decorative layer and the support layer together.

4. The floor element according to claim 3, wherein the resin material comprises epoxy.

5. The floor element according to claim 3, wherein the resin material has a viscosity less than 1000 mPas at 20° C.

6. The floor element according to claim 3, wherein the intermediate layer covers 80 percent or more of the lower surface of the decorative layer.

7. The floor element according to claim 3, wherein the intermediate layer comprises a resin content of at least 150 g/sqm.

8. The floor element according to claim 3, wherein the decorative layer has an apparent porosity between 0.1% and 10% measured according to ASTM C373.

9. The floor element according to claim 3, wherein the decorative layer has a volume of open pores between 0.01 cc and 1 cc measured according to ASTM C373.

10. The floor element according to claim 3, wherein the decorative layer comprises a red body ceramic tile.

11. The floor element according to claim 3, wherein the decorative layer comprises a glazed upper surface.

12. The floor element according to claim 3, wherein the support layer has a thickness less than 6 mm.

13. A floor covering comprising a plurality of floor elements according to claim 3.

14. A method of using a resin material for bonding together a decorative layer made of a ceramic material and a support layer to form a floor element according to claim 3, the resin material having a viscosity less than 1000 mPas at 20° C.

15. The method according to claim 14, wherein the resin material is epoxy.

16. The floor element according to claim 3, wherein the second coupling elements comprise an upward-directed lower hook-shaped part which is situated on one edge of the second couple of the at least two couples of opposite edges, as well as a downward-directed upper hook-shaped part, which is situated on an opposite edge of the second couple of the at least two couples of opposite edges.

17. A method for manufacturing a floor element, comprising:
providing a decorative layer made of a ceramic material;
providing a support layer, the support layer comprising rigid polyvinylchloride (PVC) and having a flexural modulus between 1.5 and 3.5 GPa;
providing an intermediate layer comprising a resin material for bonding the decorative layer and the support layer together; and
pressing the decorative layer, the support layer and the intermediate layer together for forming the floor element such that the resin material permeates the decorative layer,
wherein the support layer further comprises at least two couples of opposite edges provided with coupling elements configured to realize a mechanical coupling with coupling elements of adjacent floor elements, wherein the mechanical coupling results in a locking between edges of the support layer and edges of the adjacent floor elements in a vertical direction and one or more horizontal directions,
wherein first coupling elements at a first couple of the at least two couples of opposite edges are configured for being coupled to coupling elements of adjacent floor elements by means of an angling motion around a horizontal axis parallel to respective edges of the first couple of the at least two couples of opposite edges,
wherein second coupling elements at a second couple of the at least two couples of opposite edges are configured for being coupled to coupling elements of adjacent floor elements by means of a translational downward direction of respective edges of the second couple of the at least two couples of opposite edges towards each other,
wherein the first coupling elements comprise a tongue and a groove such that a play is established between the tongue and the groove,
wherein the play allows movement in a horizontal direction and is such that the tongue and the groove are coupled to each other without being deformed, and
wherein the intermediate layer is an adhesive layer that bonds the decorative layer and the support layer together.

18. The method according to claim 17, wherein the pressing is kept for a pressing time of at least 1 second.

19. The method according to claim 17, wherein a pressure of at least 350 kg/sqm is exerted onto the decorative layer, the support layer and the intermediate layer during the pressing.

20. The method according to claim 17, wherein the second coupling elements comprise an upward-directed lower hook-shaped part which is situated on one edge of the second couple of the at least two couples of opposite edges, as well as a downward-directed upper hook-shaped part, which is situated on an opposite edge of the second couple of the at least two couples of opposite edges.

* * * * *